United States Patent
Gulati et al.

(10) Patent No.: US 11,882,554 B2
(45) Date of Patent: Jan. 23, 2024

(54) OPPORTUNISTIC TRANSMISSION FOR SIDELINK COMMUNICATIONS

(71) Applicant: QUALCOMM Incorporated, San Diego, CA (US)

(72) Inventors: Kapil Gulati, Hillsborough, NJ (US); Aamod Khandekar, San Diego, CA (US); Shailesh Patil, San Diego, CA (US); Shuanshuan Wu, San Diego, CA (US); Tien Viet Nguyen, Bridgewater, NJ (US); Sudhir Kumar Baghel, Hillsborough, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/909,812

(22) Filed: Jun. 23, 2020

(65) Prior Publication Data

US 2020/0413407 A1 Dec. 31, 2020

Related U.S. Application Data

(60) Provisional application No. 62/867,751, filed on Jun. 27, 2019.

(51) Int. Cl.
*H04W 52/08* (2009.01)
*H04W 72/044* (2023.01)
(Continued)

(52) U.S. Cl.
CPC ....... *H04W 72/0473* (2013.01); *H04W 52/08* (2013.01); *H04W 52/383* (2013.01); *H04W 72/0446* (2013.01); *H04W 72/23* (2023.01)

(58) Field of Classification Search
CPC ......... H04W 72/0473; H04W 72/0446; H04W 72/14; H04W 52/08; H04W 52/383; H04B 17/21
See application file for complete search history.

(56) References Cited

U.S. PATENT DOCUMENTS 7,085,255 B2 8/2006 Jacques et al.
8,730,903 B2 5/2014 Seo et al.
(Continued)

FOREIGN PATENT DOCUMENTS

EP 1231721 A1 8/2002
EP 3404864 A1 11/2018
(Continued)

OTHER PUBLICATIONS

Huawei, HiSilicon, "Sidelink synchronization mechanisms for NR V2X", 3GPP TSG RAN WG1 Meeting #97, R1-1906012, May 13-17, 2019 (Year: 2019).*
(Continued)

*Primary Examiner* — Thinh D Tran
(74) *Attorney, Agent, or Firm* — Holland & Hart LLP/QUALCOMM Incorporated

(57) ABSTRACT

Methods, systems, and devices for wireless communications are described. A first user equipment (UE) may determine that the first UE is scheduled to transmit in a first slot and a second slot after the first slot. The first UE may then transmit, to a second UE, a first set of data in the first slot based on determining that the first UE is scheduled to transmit in the first slot and the second slot. In some examples, the first UE may determine whether a power estimation capability of the second UE satisfies a threshold. In some cases, the power estimation capability may be based on a correspondence between transmissions in the first slot and expected transmissions in the second slot. Based on the power estimation capability of the second UE, the first UE (Continued)

transmits data in a symbol reserved for automatic gain control at the second slot.

44 Claims, 13 Drawing Sheets

(51) Int. Cl.
*H04W 72/0446* (2023.01)
*H04W 72/23* (2023.01)
*H04W 52/38* (2009.01)

(56) References Cited

U.S. PATENT DOCUMENTS

| | | | |
|---|---|---|---|
| 9,661,658 B2 | 5/2017 | Li et al. | |
| 9,942,877 B2 | 4/2018 | Kim | |
| 10,021,654 B2 | 7/2018 | Kim et al. | |
| 10,644,833 B2 | 5/2020 | Sorrentino et al. | |
| 11,018,707 B2 | 5/2021 | Gulati et al. | |
| 11,146,359 B2 | 10/2021 | Gulati et al. | |
| 2003/0198279 A1* | 10/2003 | Zeira | H04W 52/10 375/130 |
| 2011/0134968 A1 | 6/2011 | Han et al. | |
| 2013/0322269 A1* | 12/2013 | Zhang | H04W 52/52 370/252 |
| 2014/0126436 A1* | 5/2014 | Safavi | H04B 1/52 370/295 |
| 2015/0067435 A1 | 3/2015 | Yerramalli et al. | |
| 2015/0358138 A1 | 12/2015 | Hwang et al. | |
| 2016/0337984 A1 | 11/2016 | Takeda et al. | |
| 2017/0027011 A1 | 1/2017 | Chae et al. | |
| 2017/0272211 A1 | 9/2017 | Chen et al. | |
| 2018/0249423 A1* | 8/2018 | Garcia | H04B 17/373 |
| 2019/0261217 A1 | 8/2019 | Nammi et al. | |
| 2019/0261288 A1 | 8/2019 | Loehr et al. | |
| 2019/0281563 A1 | 9/2019 | Lee | |
| 2020/0092044 A1 | 3/2020 | Park et al. | |
| 2020/0267661 A1 | 8/2020 | Park et al. | |
| 2020/0389250 A1* | 12/2020 | Goichberg | H04L 1/0003 |
| 2021/0112505 A1* | 4/2021 | Li | H04W 72/005 |

FOREIGN PATENT DOCUMENTS

| | | |
|---|---|---|
| WO | WO-2013155253 A1 | 10/2013 |
| WO | WO-2015031743 A1 | 3/2015 |
| WO | WO-2018030949 A1 | 2/2018 |
| WO | WO-2019053631 A1 | 3/2019 |

OTHER PUBLICATIONS

Fujitsu, "Discussion on physical layer structure for NR sidelink", 3GPP TSG RAN WG1 #97, R1-1906436, May 13-17, 2019 (Year: 2019).*

LG Electronics, "Discussion on physical layer structure for NR sidelink", 3GPP TSG RAN WG1 #97, R1-1907012, May 13-17, 2019 (Year: 2019).*

Ericsson: "Link Level Evaluations of NR PSSCH", 3GPP Draft, 3GPP TSG-RAN WG1 Meeting #97, R1-1907148, ERICSSON—Link Level Evaluations of NR PSSCH, 3rd Generation Partnership Project (3GPP), Mobile Competence Centre, 650, Route Des Lucioles, F-06921, Sophia-Antipolis Cedex, France, vol. RAN WG1, No. Reno, Nevada, U.S, May 13, 2019-May 17, 2019, May 13, 2019 (May 13, 2019), XP051728594, 8 pages, Retrieved from the Internet: URL: http://www.3gpp.org/ftp/Meetings%5F3GPP%5FSYNC/RAN1/Docs/R1%2D1907148%2Ezip [retrieved on May 13, 2019] sections 2.1.2 and 2.1.3.

International Search Report and Written Opinion—PCT/US2020/039297—ISA/EPO—dated Sep. 30, 2020.

LG Electronics: "Discussion on Physical Layer Structure for NR Sidelink", 3GPP Draft, 3GPP TSG RAN WG1 #97, R1-1907012, Discussion on Physical Layer Structure for NR Sidelink, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728460, 25 pages, Retrieved from the Internet: URL: http://www.3gpp.org/ftp/Meetings%5F3GPP%5FSYNC/RAN1/Docs/R1%2D1907012%2Ezip [retrieved on May 13, 2019] section 2.

Samsung: "On Physical Layer Structures for NR V2X," 3GPP Draft, 3GPP TSG RAN WG1 #97 Meeting, R1-1906934, On Physical Layer Structures for NR V2X, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728384, 8 pages, Retrieved from the Internet: URL: http://www.3gpp.org/ftp/Meetings%5F3GPP%5FSYNC/RAN1/Docs/R1%2D1906934%2Ezip [retrieved on May 13, 2019] section 6, p. 7.

Huawei, et al., "Discussion on Solving the Code Rate Issue for Supporting 64QAM", 3GPP Draft, 3GPP TSG RAN WG1 Meeting #90bis, R1-1717003, Prague, Czech Republic, Oct. 9, 2017-Oct. 13, 2017, Sep. 29, 2017 (Sep. 29, 2017), XP051351509, 7 Pages, Retrieved from the Internet: URL: http://www.3gpp.org/ftp/tsg_ran/WG1_RL1/TSGR1_90b/Docs/. [Retrieved on Sep. 29, 2017].

Huawei, et al., "Summary of email discussion [90b-LTE-02] on the list of MCS-TBS problematic cases for Rel-14 V2X PSSCH decoding," R1 -1721293, 3GPP TSG RAN WG1 Meeting #91, Reno, USA, Nov. 27-Dec. 1, 2017, Agenda Item: 6.1.3, 5 pages.

Samsung: "Code Block Reordering in HARQ Retransmissions", 3GPP TSG RAN WG1 Meeting #50, 3GPP Draft, R1-073579, 3rd Generation Partnership Project (3GPP), Mobile Competence Centre, 650, Route Des Lucioles, F-06921 Sophia-Antipolis Cedex, France, vol. RAN WG1, No. Athens, Greece; Aug. 20, 2007-Aug. 24, 2007, Aug. 15, 2007 (Aug. 15, 2007), pp. 1-4, XP050107182, [retrieved on Aug. 15, 2007].

* cited by examiner

OPPORTUNISTIC TRANSMISSION FOR SIDELINK COMMUNICATIONS

CROSS REFERENCE

The present application for patent claims the benefit of U.S. Provisional Patent Application No. 62/867,751 by GULATI et al., entitled "OPPORTUNISTIC TRANSMISSION FOR SIDELINK COMMUNICATIONS," filed Jun. 27, 2019, assigned to the assignee hereof, and expressly incorporated by reference herein.

INTRODUCTION

The following relates to wireless communications, and more specifically to managing transmissions in sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a first UE is described. The method may include determining that the first UE is scheduled to transmit in a first slot and a second slot after the first slot. In some examples, the method may further include transmitting, to a second UE, a first set of data in the first slot based on determining that the first UE is scheduled to transmit in the first slot and the second slot. In some cases, the method may further include determining whether a power estimation capability of the second UE satisfies a threshold based on the transmission of the first set of data in the first slot and an upcoming transmission in the second slot. The method may also include transmitting, based on the power estimation capability of the second UE satisfying the threshold, data in a symbol reserved for automatic gain control (AGC) at the second slot.

An apparatus for wireless communication at a first UE is described. The apparatus may include a processor, and memory coupled with the processor. The processor and memory may be configured to determine that the first UE is scheduled to transmit in a first slot and a second slot after the first slot and transmit, to a second UE, a first set of data in the first slot based on determining that the first UE is scheduled to transmit in the first slot and the second slot. The processor and memory may further be configured to determine whether a power estimation capability of the second UE satisfies a threshold based on the transmission of the first set of data in the first slot and an upcoming transmission in the second slot. In some examples, the processor and memory may be configured to transmit, based on the power estimation capability of the second UE satisfying the threshold, data in a symbol reserved for AGC at the second slot.

Another apparatus for wireless communication at a first UE is described. The apparatus may include means for determining that the first UE is scheduled to transmit in a first slot and a second slot after the first slot and transmitting, to a second UE, a first set of data in the first slot based on determining that the first UE is scheduled to transmit in the first slot and the second slot. In some cases, the apparatus may include means for determining whether a power estimation capability of the second UE satisfies a threshold based on the transmission of the first set of data in the first slot and an upcoming transmission in the second slot, and transmitting, based on the power estimation capability of the second UE satisfying the threshold, data in a symbol reserved for AGC at the second slot.

A non-transitory computer-readable medium storing code for wireless communication at a first UE is described. The code may include instructions executable by a processor to determine that the first UE is scheduled to transmit in a first slot and a second slot after the first slot and transmit, to a second UE, a first set of data in the first slot based on determining that the first UE is scheduled to transmit in the first slot and the second slot. In some cases, the code may further include instructions executable by the processor to determine whether a power estimation capability of the second UE satisfies a threshold based on the transmission of the first set of data in the first slot and an upcoming transmission in the second slot, and transmit, based on the power estimation capability of the second UE satisfying the threshold, data in a symbol reserved for AGC at the second slot.

In some examples of the method, apparatuses, and non-transitory computer-readable medium described herein, the symbol reserved for AGC at the second slot may be located at a temporal beginning of the second slot.

Some examples of the method, apparatuses, and non-transitory computer-readable medium described herein may further include operations, features, means, or instructions for receiving, from the second UE, an indication of an ability of the second UE to predict a received signal power. In some cases, transmitting the data in the symbol reserved for AGC is based on the received indication.

In some examples of the method, apparatuses, and non-transitory computer-readable medium described herein, the determining may further include operations, features, means, or instructions for identifying a resource reservation associated with the upcoming transmission in the second slot. In some examples, the determining may further include operations, features, means, or instructions for transmitting, to the second UE, an indication of the resource reservation, and determining that the power estimation capability of the second UE satisfies the threshold based on transmitting the indication.

In some examples of the method, apparatuses, and non-transitory computer-readable medium described herein, the determining may further include operations, features, means, or instructions for identifying an absence of a resource reservation associated with the upcoming transmission in the second slot, and determining that the power estimation capability of the second UE does not satisfy the threshold based on the identifying. In some examples of the method, apparatuses, and non-transitory computer-readable medium described herein, the resource reservation associated with the upcoming transmission includes a reservation of resources for the upcoming transmission in the second slot.

In some examples of the method, apparatuses, and non-transitory computer-readable medium described herein, the determining may further include operations, features, means, or instructions for identifying a first transmission power associated with transmissions in the first slot and identifying a second transmission power associated with the upcoming transmission in the second slot. In some examples, the determining may further include operations, features, means, or instructions for determining that a difference between the first transmission power and the second transmission power satisfies a second threshold, and determining that the power estimation capability of the second UE satisfies the threshold based on the difference.

In some examples of the method, apparatuses, and non-transitory computer-readable medium described herein, the determining may further include operations, features, means, or instructions for identifying a first transmission power associated with transmissions in the first slot and identifying a second transmission power associated with the upcoming transmission in the second slot. In some examples, the determining may further include operations, features, means, or instructions for determining that a difference between the first transmission power and the second transmission power does not satisfy a second threshold, and determining that the power estimation capability of the second UE does not satisfy the threshold based on the difference.

In some examples of the method, apparatuses, and non-transitory computer-readable medium described herein, the determining may further include operations, features, means, or instructions for identifying a first transmission power associated with the transmission of the first set of data and receiving, from the second UE, a command to adjust the first transmission power. In some examples, the determining may further include operations, features, means, or instructions for adjusting, based on receiving the command, a second transmission power associated with the upcoming transmission in the second slot, and determining that the power estimation capability of the second UE satisfies the threshold based on the adjusting. In some examples of the method, apparatuses, and non-transitory computer-readable medium described herein, the command includes a transmit power control command.

In some examples of the method, apparatuses, and non-transitory computer-readable medium described herein, the determining may further include operations, features, means, or instructions for receiving, from a base station, a first grant associated with transmissions in the first slot, and receiving, from the base station, a second grant associated with transmissions in the second slot. In some examples, the determining may further include operations, features, means, or instructions for determining that the power estimation capability of the second UE satisfies the threshold based on the first grant and the second grant.

In some examples of the method, apparatuses, and non-transitory computer-readable medium described herein, the first grant and the second grant may be a same grant. In some examples of the method, apparatuses, and non-transitory computer-readable medium described herein, the first grant and the second grant may be different grants.

Some examples of the method, apparatuses, and non-transitory computer-readable medium described herein may further include operations, features, means, or instructions for mapping the data to the symbol at a temporal beginning of the second slot, where transmitting the data may be based on the mapping.

In some examples of the method, apparatuses, and non-transitory computer-readable medium described herein, the data include coded data bits. In some examples of the method, apparatuses, and non-transitory computer-readable medium described herein, the data in the symbol reserved for AGC include coded data bits different from coded data bits associated with AGC.

In some examples of the method, apparatuses, and non-transitory computer-readable medium described herein, the power estimation capability of the second UE includes an ability of the second UE to predict a received signal power associated with one or more transmissions in the second slot.

In some examples of the method, apparatuses, and non-transitory computer-readable medium described herein, the power estimation capability of the second UE may be further based on one or more of a total received signal power observed by the second UE in the first slot, a reference signal received power observed by the second UE for the first UE in the first slot, a spatial configuration used by the second UE for reception in the first slot, or a combination thereof.

In some examples of the method, apparatuses, and non-transitory computer-readable medium described herein, the total received signal power includes a received signal strength indicator (RSSI) for the first slot. In some examples of the method, apparatuses, and non-transitory computer-readable medium described herein, the first set of data includes an indication of the second slot.

In some examples of the method, apparatuses, and non-transitory computer-readable medium described herein, the first set of data includes a control transmission. In some examples of the method, apparatuses, and non-transitory computer-readable medium described herein, the second slot may be immediately subsequent to the first slot, and where the indication of the second slot includes a number of slots over which the first UE intends to transmit.

In some examples of the method, apparatuses, and non-transitory computer-readable medium described herein, at least one slot occurs between the first slot and the second slot. In some examples of the method, apparatuses, and non-transitory computer-readable medium described herein, the first slot and the second slot include an aggregated slot.

DETAILED DESCRIPTION

Figure 1:
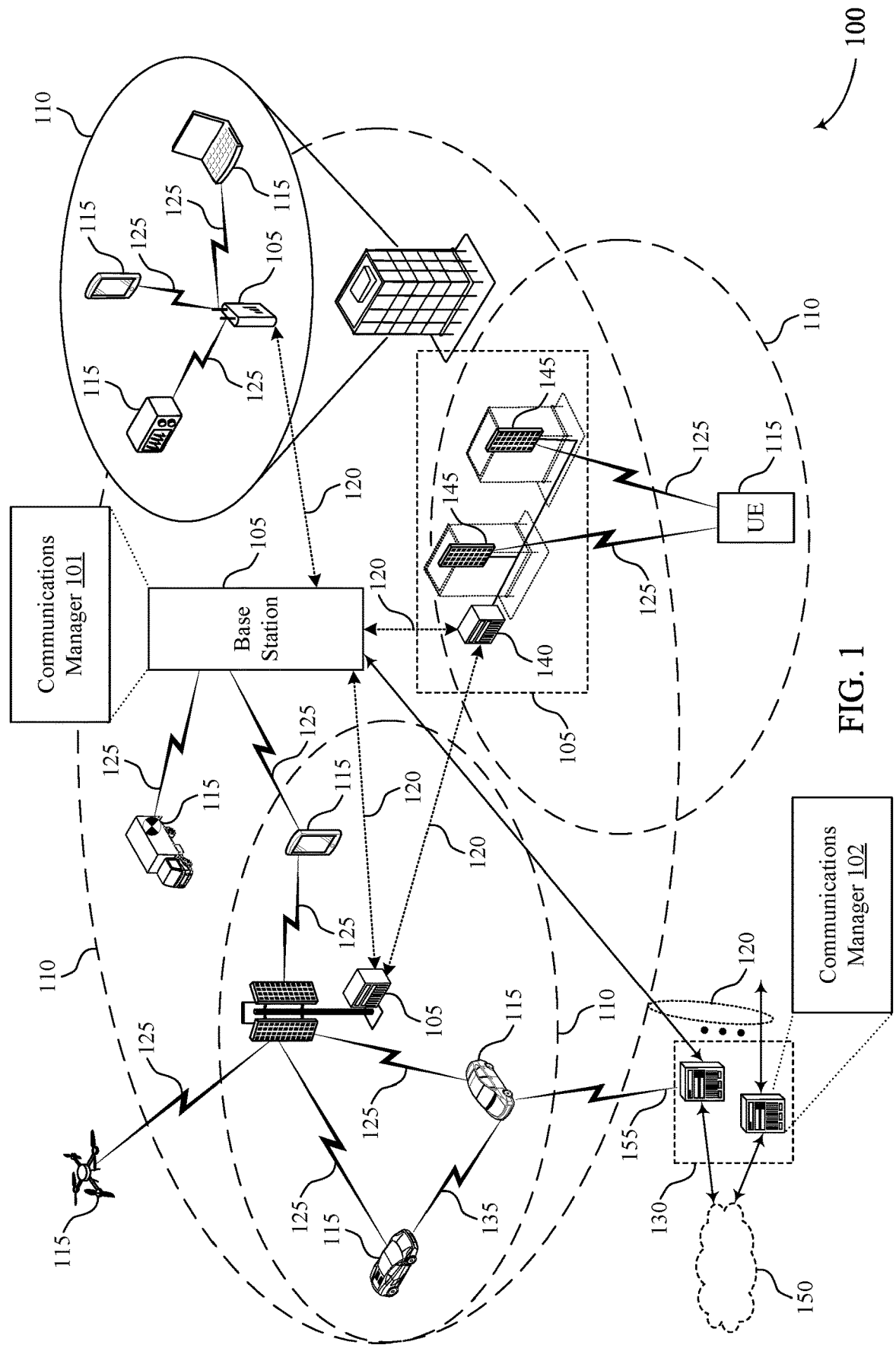
FIG. 1 illustrates an example of a wireless communications system that supports opportunistic transmission for sidelink communications in accordance with one or more aspects of the present disclosure.

A UE may receive transmissions from one or more UEs in a slot and may process (e.g., decode or attempt to decode) a transmission based on applying a gain to the transmissions (e.g., applying a gain to a signal derived from the transmissions). In some cases, a power of the transmissions may be high enough to saturate a low noise amplifier (LNA) applying the gain or may be low enough such that the transmissions go undetected or become undecodable. Such LNA saturation may inhibit an ability of the UE to decode the transmissions. To prevent LNA saturation while maintaining sufficient gain for detection or decoding, the UE may perform an AGC at a start of the slot. AGC may involve the UE detecting a power of the transmissions over one or more beginning symbols (e.g., a first symbol) of the slot and changing to another gain for the remaining symbols of the slot to receive a transmission. In some cases, the one or more beginning symbols reserved for AGC may be referred to as AGC symbols. The gain used by a receiving UE for the remaining symbols of the slot may be configured to enable the receiving UE to decode the transmissions of that slot without saturating the LNA. A receiving UE may perform AGC at the start of each slot and may use a same default gain while performing AGC in an attempt to decode control or data information in the first symbol. The power of transmissions in each slot may vary from slot to slot in sidelink deployments in which the number and proximity of transmitting devices (e.g., UEs) may vary or otherwise be unpredictable from slot to slot.

In some cases, a correspondence (e.g., a temporal correlation, a spatial correlation, or both) may exist between a first slot and a second slot (e.g., between transmissions in the first slot and expected transmissions in the second slot). In such cases, a UE may use a default gain at the start of the first slot and may use another gain at the start of the second slot based on the correspondence between the first slot and the second slot. For instance, a total received signal power (e.g., an RSSI) in the first slot may be associated with a total received signal power (e.g., another RSSI) in the second slot and a receiving UE may determine the gain to use at the start of the second slot based on the association between the total received signal power in the first slot and the total received signal power in the second slot. In one example, a receiving UE may refrain from performing AGC in a future slot if a correspondence (e.g., a temporal correlation, a spatial correlation, or both) exists between a prior slot and a future slot. In such cases, a transmitting UE may opportunistically use symbols at the beginning of the future slot (i.e., symbols reserved for performing AGC at the future slot) to transmit coded data bits to the receiving UE.

In one example, a first UE (transmitting UE) may determine that the first UE is scheduled to transmit in a first slot and a second slot. The first UE may then transmit a first set of data to a second UE (receiving UE). In some cases, the first set of data may include control information of transmissions in a first slot. In some examples, the first UE may indicate a resource reservation associated with an upcoming transmission. That is, the first UE may indicate to the second UE, that the first UE intends to transmit over a future slot (or the second slot). Upon identifying such resource reservation, the receiving UE may use the gain determined in the first slot while receiving data in the second slot. In such cases, the first UE may determine that the power estimation capability of the second UE satisfies a threshold. The first UE may then opportunistically transmit data in a symbol reserved for AGC at the second slot.

Aspects of the disclosure are initially described in the context of a wireless communications system. Additional aspects of the disclosure are described in the context of an additional wireless communications system, transmission schemes, and a process flow. Aspects of the disclosure are further illustrated by and described with reference to apparatus diagrams, system diagrams, and flowcharts that relate to opportunistic transmission for sidelink communications.

FIG. 1 illustrates an example of a wireless communications system 100 that supports opportunistic transmission for sidelink communications in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. In some cases, a UE 115 may communicate with the core network 130 through a communication link 155.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both).

Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a TTI. In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g. synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some wireless communications system support sidelink transmissions, where one or more symbols at a beginning of a slot is reserved for performing AGC. In some cases, a correspondence (e.g., a temporal correlation, a spatial correlation, or both) may exist between a first slot and a second slot (e.g., between transmissions in the first slot and expected transmissions in the second slot). In such cases, a UE may use a default gain at the start of the first slot and may use another gain at the start of the second slot based on the correspondence between the first slot and the second slot. For instance, a receiving UE may refrain from performing AGC in a future slot if a correspondence (e.g., a temporal correlation, a spatial correlation, or both) exists between a prior slot and a future slot.

According to one or more aspects of the present disclosure, a base station 105 may include a communications manager 101, and a network device may include a communications manager 102. The transmitting UE 115 may opportunistically use symbols at the beginning of the future slot (i.e., symbols reserved for performing AGC at the future slot) to transmit coded data bits to a receiving UE 115. The described techniques provide for a first UE 115 (transmitting UE 115) to determine that the first UE 115 is scheduled to transmit in a first slot and a second slot after the first slot. The first UE 115 may transmit, to a second UE 115 (receiving UE 115), a first set of data in the first slot based on determining that the first UE 115 is scheduled to transmit in the first slot and the second slot. The first UE 115 may determine whether a power estimation capability of the second UE 115 satisfies a threshold. In some cases, the power estimation capability for the second UE 115 may be based on a correspondence (e.g., a temporal correlation, a spatial correlation, or both) between the first slot and a second slot. In some cases, the second UE 115 may transmit an indication of an ability of the second UE 115 to predict a received signal power. In some examples, the first UE 115 may determine whether the second UE 115 may configure a receiver with a second gain at the beginning of the second slot based on based on the correspondence. As used herein, a correspondence between slots may refer to a correspondence between transmissions received or expected to be received during the slots. For instance, the second UE 115 may determine that a total receive signal power in the second slot is associated with the total receive power in the first slot. The first UE 115 may then transmit data in a symbol reserved for AGC at the second slot.

Figure 2:
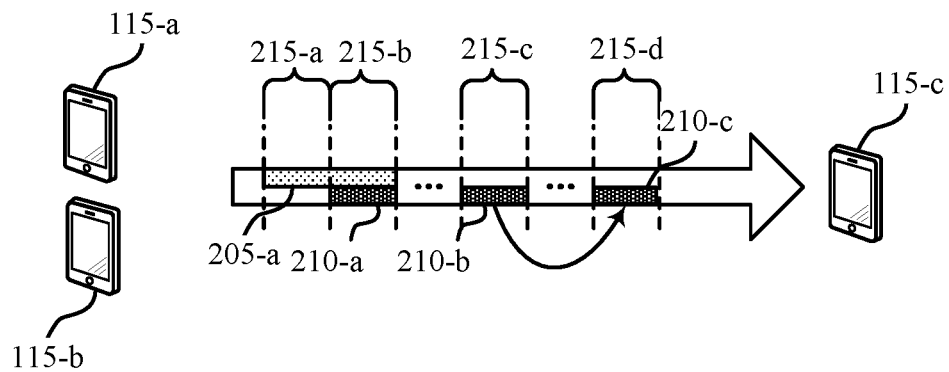
FIG. 2 illustrates an example of a wireless communications system that supports opportunistic transmission for sidelink communications in accordance with one or more aspects of the present disclosure.

FIG. 2 illustrates an example of a wireless communications system 200 that supports opportunistic transmission for sidelink communications in accordance with one or more aspects of the present disclosure. In some examples, the wireless communications system 200 may implement aspects of the wireless communications system 100. For instance, the wireless communications system 200 may include UE 115-$a$, UE 115-$b$, and UE 115-$c$, which may be examples of the UEs 115 as described with reference to FIG. 1.

As depicted in the example of FIG. 2, the UE 115-$a$ and the UE 115-$b$ may perform sidelink communications with the UE 115-$c$. For instance, the UE 115-$a$ may transmit UE1 transmissions 205 to the UE 115-$c$ and the UE 115-$b$ may transmit UE2 transmissions 210 to the UE 115-$c$. The UE1 transmissions 205 and the UE2 transmissions 210 may span one slot 215 or may span multiple slots 215 (e.g., using slot aggregation). For instance, the UE1 transmission 205-$a$ may span slots 215-$a$ and 215-$b$, which may be consecutive slots 215. In some cases, the UE2 transmission 210-$a$ may span slot 215-$b$, the UE2 transmission 210-$b$ may span slot 215-$c$, and the UE2 transmission 210-$c$ may span slot 215-$d$. For example, the UE2 transmission 210-$a$, 210-$b$, and 210-$c$ may span separate slots. In some cases, the UE2 transmission 210-$c$ may be a retransmission of the UE2 transmission 210-$b$. Additionally, each of the UE1 transmission 205 or the UE2 transmission 210 may include a control region and a data region.

A receiving UE (such as, UE 115-$c$) may determine a receive power associated with the transmissions received in each slot (such as, the UE1 transmission 205 and the UE2 transmission 210). In general, a total received signal power (e.g., an RSSI) may vary from a first slot to a second slot (e.g., from slot 215-$a$ to slot 215-$b$). For instance, a total received signal power of slot 215-$a$ may be different from a total received signal power of slot 215-$b$ (e.g., the slot 215-$a$, which may contain the UE1 transmission 205-$a$ alone may have a different total received signal power from the slot 215-$b$, which may contain the UE1 transmission 205-$a$ and the UE2 transmission 210-$a$). In some cases, the total received signal power of a first slot 215 may be independent of a second slot 215 unless the two slots 215 have a temporal or spatial correlation. Two slots 215 may be temporally correlated if at least a portion of the total received signal power of a first slot 215 corresponds to (or is expected to correspond to) at least a portion of the total received signal power of a second slot 215.

In wireless communications system 200, a receiving UE (such as, UE 115-c) may perform an AGC retraining or setting at the beginning of a slot 215. In some examples, AGC retraining may be performed at the beginning of each slot 215, as it may be assumed that total received signal power may vary from slot 215 to slot 215, or may be performed for a subset of slots 215 (e.g., may only be performed for a first slot 215 of a set of temporally correlated slots 215). AGC may determine an optimal front end gain to use to receive transmissions in a slot 215 where AGC retraining is being performed based on a total received signal power at the beginning of the slot 215. AGC retraining may use a wideband RSSI measurement (e.g., $I^2+Q^2$) based on initial samples of a slot 215 to determine a total received signal power of the slot 215. A gain setting may be chosen that yields a high signal-to-quantization-noise ratio (SQNR). In general, AGC retraining may occur over a AGC setting time which may include an RSSI measurement, determining a gain setting, and programming the front end. The AGC setting time may be a time for an LNA gain state (e.g., the LNA whose gain is being programmed) to settle. In some cases, the AGC setting time may be approximately 34 microseconds (μs), which may be one symbol at 30 kilohertz (kHz). In some cases, the UE 115

A transmitting UE (such as UE 115-a and/or UE 115-b) may determine whether to transmit data on the AGC symbols. For example, the transmitting UE (UE 115-a and/or UE 115-b) may determine whether to opportunistically schedule data transmission on symbols reserved for performing AGC retraining or setting at the receiving UE (or UE 115-c). In one example, the UE 115-a and/or UE 115-b may not attempt to opportunistically use the AGC symbols to transmit data. Because AGC symbols are used for performing an AGC retraining or setting at a beginning of a slot, the AGC symbols are potentially vulnerable symbols. In some cases, the AGC symbols may be rate matched at the transmitting UE (such as UE 115-a and/or UE 115-b), and the transmitting UE may utilize the AGC symbol to transmit a special sequence for AGC retraining or setting. In such an example, transmitting a sequence in the beginning of each slot may result in a loss with respect to spectral efficiency or throughput and range. In some cases, the loss may depend on the subcarrier spacing as well as additional transmission parameters (e.g. total number of resource elements for data bits).

Alternatively, transmitting UE (such as UE 115-a and/or UE 115-b) may transmit data (such as coded data bits) on one or more symbols associated with performing AGC retraining or setting (or reserved for performing AGC retraining). As previously discussed, a receiving UE 115-c may perform an AGC retraining or setting at the beginning of a slot 215 to determine an optimal front end gain to use to receive transmissions in the slot 215. If the receiving UE 115 performs an AGC retraining or setting, then the data transmitted on the AGC symbols (e.g., on one or more symbols reserved for performing AGC retraining) may be lost. That is, an AGC symbol may be lost or punctured at the receiving UE (or UE 115-c) when the initial gain state is not suitable for reception of transmissions in the slot. Loss of data due to such puncturing may result in a performance loss at the receiving UE (UE 115-c). In one example, the performance loss may be approximately proportional to a ratio of a number of punctured resource elements and a total number of resource elements. In other examples, the performance loss may be high and may result in a significant performance degradation at the receiving UE (UE 115-c).

According to one or more aspects of the present disclosure, a transmitting UE (such as UE 115-a and/or UE 115-b) may opportunistically use the AGC symbols for transmitting data when there is a high probability that the AGC symbols will not get punctured at the receiving UE (such as UE 115-c). In some examples, the transmitting UE (UE 115-a and/or UE 115-b) may determine that the transmitting UE is scheduled to transmit in a first slot and a second slot after the first slot. As depicted in the example of FIG. 2, the UE 115-a may determine that the UE 115-a is scheduled to transmit in slot 215-a and slot 215-b. Additionally, the UE 115-b may determine that the UE 115-b is scheduled to transmit in slot 215-b and slot 215-c. In some cases, the second slot is immediately subsequent to the first slot (e.g., slots 215-a and 215-b) and may form an aggregated slot. In other cases, the at least one slot occurs between the first slot and the second slot (e.g., slots 215-b and 215-c).

In general, the UE 115-c may receive one or more communications from UE 115-a and/or 115-b (e.g., UE1 transmissions 205 and/or UE2 transmissions 210) in a first slot 215. For example, with reference to the transmitting UE 115-a, the UE 115-c may receive UE1 transmissions 205 beginning in the slot 215-a. The UE 115-c may begin reception in the first slot (e.g., slot 215-a) with an initial receiver gain (e.g., a default receiver gain) and may perform AGC retraining during one or more beginning symbols (e.g., a first symbol) of the first slot 215-a. Upon performing AGC retraining, UE 115-c may determine an updated receiver gain with which the UE 115-c may receive a remaining portion of the one or more communications in the other symbols of the first slot 215. If the first slot 215 is temporally correlated with a second slot 215, UE 115-c may use a receiver gain at the beginning of the second slot 215 that is different from the initial receiver gain to receive one or more communications from UE 115-a and/or UE 115-b. In some cases, the receiver gain used at the beginning of the second slot 215 may be associated with the updated receiver gain of the first slot 215. For instance, the receiver gain at the beginning of the second slot 215 may be equal to the updated receiver gain of the first slot 215 or may be otherwise based on the updated receiver gain of the first slot 215. For example, while receiving transmissions from UE 115-a on slots 215-a and 215-b, the UE 115-c may use the receiver gain calculated at the beginning of the slot 215-a.

One example of a transmission with a temporally correlated first slot 215 and second slot 215 may be a slot-aggregated transmission (e.g., UE1 transmission 205-a). A slot-aggregated transmission may span multiple consecutive slots 215 and may have a total received signal power in each slot 215 correlated with the total received signal powers in the other slots 215. For instance, at least a portion of the total received signal powers for both slots 215-a and 215-b may be due to UE1 transmission 205-a. A power of UE1 transmission 205-a over slot 215-a may correspond to (e.g., be approximately the same as) a power of UE1 transmission 205-a over slot 215-b. As such, slots 215-a and 215-b may be temporally correlated.

Another example of a transmission with a temporally correlated first slot 215 and second slot 215 may be a transmission including a resource reservation (e.g., UE2 transmission 210-b, which may have a reserved resource for UE2 transmission 210-c). The transmission indicating the resource reservation may be in a slot n and the reserved resource may span a slot m. Slot n and slot m may be consecutive or non-consecutive slots (e.g., slot m may not be a slot 215 immediately subsequent to slot n). The reserved resource may be used if the transmission is to be retransmitted (e.g., UE2 transmission 210-c may be a retransmitted UE2 transmission 210-b), such as if UE 115-c does not correctly decode all of UE2 transmission 210-b. The slot including the transmission indicating the resource reservation may have a total received signal power that corresponds to a total received signal power of the slot 215 which the indicated reserved resource may spans. For instance, at least a portion of the total received signal powers for slots 215-c and 215-d may be due to UE2 transmissions 210-b and 210-c. UE2 transmission 210-c may be a retransmission of UE2 transmission 210-b and, thus, a receive power of UE2 transmission 210-b may correspond to (e.g., be approximately the same as) a receive power of UE2 transmission 210-c. In some cases, the reserved resource may be used for different transmissions (e.g., UE2 transmission 210-c may not be a retransmitted UE2 transmission 210-b).

In some cases, a transmitting UE (UE 115-a and/or UE 115-b) may determine, whether a power estimation capability of the receiving UE (UE 115-c) satisfies a threshold. In one example, the receiving UE (UE 115-c) may indicate (via a message to the transmitting UE) that it has an ability to predict a received signal power. In one example, the transmitting UE (UE 115-a and/or UE 115-b) determines that the transmitting UE has reserved a resource for a future transmission. For example, the transmitting UE may reserve the resource for the future transmission (i.e., transmission in a future slot) in a prior slot. Additionally, the transmitting UE may determine that such a reservation was announced to the receiving UE (UE 115-c) during the prior slot. In such an example, the transmitting UE (UE 115-a and/or UE 115-b) may determine that the receiving UE (UE 115-c) is able to predict the expected receive power.

In some cases, UE 115-c may receive an indication of the temporally correlated second slot 215 based on the one or more communications from UE 115-a and/or 115-b in the first slot 215. The indication may indicate that the UE 115 providing the indication in the first slot 215 may transmit a communication in the second slot 215. For instance, UE 115-c may decode a communication from UE 115-a (e.g., a UE1 transmission 205) in the first slot 215 that indicates a second slot 215 in which UE 115-a may transmit. In some cases, the indication of the second slot 215 may be included in a control region of the communication (e.g., the communication may include a control transmission). If the second slot 215 is an immediately subsequent slot 215 after the first slot 215 (e.g., in a slot-aggregated transmission, such as UE1 transmission 205-a), the indication may be or may be based on a number of slots (e.g., consecutive slots) that UE 115-a intends to transmit over. For instance, UE1 transmission 205-a may include an indication that UE 115-a is to transmit a UE1 transmission 205-a over two slots 215 (e.g., slots 215-a and 215-b). If the second slot 215 is not an immediately subsequent slot 215 after the first slot 215 (e.g., in a resource reservation transmission, such as UE2 transmission 210-b), the indication of the second slot 215 may be included as a reserved resource in the second slot 215. In this example, the UE 115-a may determine that the UE 115-c is able to estimate the expected receive power for the second slot 215 (e.g., slot 215-b) based on transmitting the indication of resource reservation. Based on the power estimation capability of UE 115-c, the transmitting UE (UE 115-a and/or UE 115-b) may transmitting data in a symbol reserved for AGC at a future slot.

Alternatively, the transmitting UE (UE 115-a and/or UE 115-b) may identify an absence of a resource reservation associated with the upcoming transmission in the second slot. For example, UE 115-b may determine that the UE 115-b has not transmitted a resource reservation in a first slot 215-b. That is, the UE 115-b has not indicated (in slot 215-b) that the UE 115-b intends to transmit in future slots 215-c and 215-d. In such cases, the transmitting UE (i.e., UE 115-b) may determine that the power estimation capability of the UE 115-c does not satisfy the threshold. In such cases, the UE 115-b may refrain from mapping data bits to one or more AGC symbols at the beginning of a future slot (such as slot 215-c in this example).

According to one or more aspects, the transmitting UE (UE 115-a and/or UE 115-b) may determine, that a power estimation capability of the receiving UE (UE 115-c) satisfies a threshold, if a transmission power used by the transmitting UE for transmission in a previous slot is beyond a power threshold (i.e., higher or lower) than that transmission power expected for transmission in a future slot). In one example, UE 115-b may identify a first transmission power associated with transmissions in a first slot (e.g., slot 215-b), and may identify a second transmission power associated with an upcoming transmission in a second slot (e.g., slot 215-c). The UE 115-b may then determine whether a difference between the first transmission power and the second transmission power satisfies a power threshold. For example, the UE 115-b may determine whether the difference between the first transmission power and the second transmission power is less than 3 dB. In some cases, if the UE 115-b determines that the difference between the first transmission power and the second transmission power satisfies the power threshold, then the UE 115-b may transmit data in a symbol intended for transmitting non-critical data or dummy data (e.g., reserved for AGC) at the second slot (e.g., slot 215-c). Alternatively, if the UE 115-b determines that the difference between the first transmission power and the second transmission power does not satisfy the power threshold, then the UE 115-b may refrain from transmitting data in a symbol reserved for AGC at the second slot (e.g., slot 215-c).

In some cases, the UE 115-c may provide power control feedback for transmission by the UE 115 providing the indication of the second slot 215. The power control feedback may enable the UE 115 providing the indication to determine the receiver gain for the second slot 215. The UE 115 providing the indication may change a transmission power of a transmission in the second slot 215 based on the power control feedback (which may be a transmit power control command). In some cases, the transmitting UE (UE 115-a and/or UE 115-b) may determine that a power estimation capability of the receiving UE (UE 115-c) satisfies a threshold, if the transmitting UE performs a transmission power adjustment between a previous slot and a future slot. In some cases, the transmission power adjustment may be based on a transmit power control command received from the receiving UE (UE 115-c).

According to one or more aspects, the UE 115-b may transmit a first transmission in a first slot (slot 215-b) using a first transmission power. Upon transmitting the first transmission, the UE 115-b may receive, from the UE 115-c, a command to adjust the first transmission power for future transmissions. The UE 115-c may adjust a second transmission power associated with an upcoming transmission in a second slot (slot 215-c). In this example scenario, the UE 115-a may determine that the power estimation capability of the UE 115-c satisfies the threshold. That is, the UE 115-b may determine that the UE 115-c will be able to estimate a power for receiving transmissions in a future slot (or second slot). In some cases, the UE 115-*b* may transmit data in a symbol to be utilized to perform AGC at the second slot (e.g., slot 215-*c*).

According to one or more aspects, the transmitting UE (UE 115-*a* and/or UE 115-*b*) may receive one or more grants from a base station. For example, the UE 115-*a* may receive a first grant associated with transmissions in the slot 215-*a* and a second grant associated with transmissions in the slot 215-*b*. Additionally or alternatively, the UE 115-*b* may receive a first grant associated with transmissions in the slot 215-*b* and a second grant associated with transmissions in the slot 215-*c*. In such cases, the transmitting UE (UE 115-*a* and/or UE 115-*b*) may determine that the power estimation capability of the UE 115-*c* satisfies the threshold based on the first grant and the second grant. In some examples, the first grant and the second grant may be the same grant or different grants.

In some cases, the UE 115-*c* may be able to estimate a receiver gain at the beginning of the second slot 215 based on a total received signal power in the first slot 215, a reference signal received power (RSRP) level of the UE 115 providing the indication of the second slot 215, a spatial configuration (e.g., a beam) used for reception by UE 115-*c* in the first slot 215 (or transmission by another UE 115 in the first slot 215, which may be signed to UE 115-*c*), a spatial configuration used for reception by UE 115-*c* in the second slot 215 (or transmission by another UE 115 in the second slot 215, which may be signed to UE 115-*c*), or any combination thereof. For instance, UE 115-*c* may determine what fraction of the total received signal power in the first slot 215 is due to the UE 115 in the first slot 215 providing the indication of the second slot 215 and may determine the receiver gain of at the beginning of the second slot 215 based on the fraction. This fraction of the receive power may be the expected receive power in the second slot 215. In one example, the fraction may be $RSRP_{UE}/RSSI$, where $RSRP_{UE}$ may correspond to an RSRP level associated with the UE 115 providing the indication of the second slot 215 and RSSI may be a total received signal power (e.g., an RSSI) observed by the UE 115-*c* in the first slot 215.

In some cases, a UE 115 performing an AGC operation (e.g., UE 115-*c*) may not be a receiver for which the one or more communications from UE 115-*a* and/or UE 115-*b* is intended. Such a UE 115 may still decode and look at the control information from the communication, but may determine that the data is not for the UE 115 and may not decode the data. Such a UE 115 may perform the operation of control decoding, RSRP measurement, and AGC functionality for all received transmission for the purpose of receive gain prediction of the second slot 215.

Opportunistic data transmission on symbols reserved for AGC by exploiting the temporal or spatial correlation may yield better performance. For instance, it may be expected that the probability of losing data on the one or more beginning symbols (e.g., one symbol for 15/30 kHz subcarrier spacing (SCS), two symbols for 60 kHz SCS) may be reduced, as the transmitter transmits data on a future slot if the receiver gain of the future slot is based on a previous slot.

Figure 3:
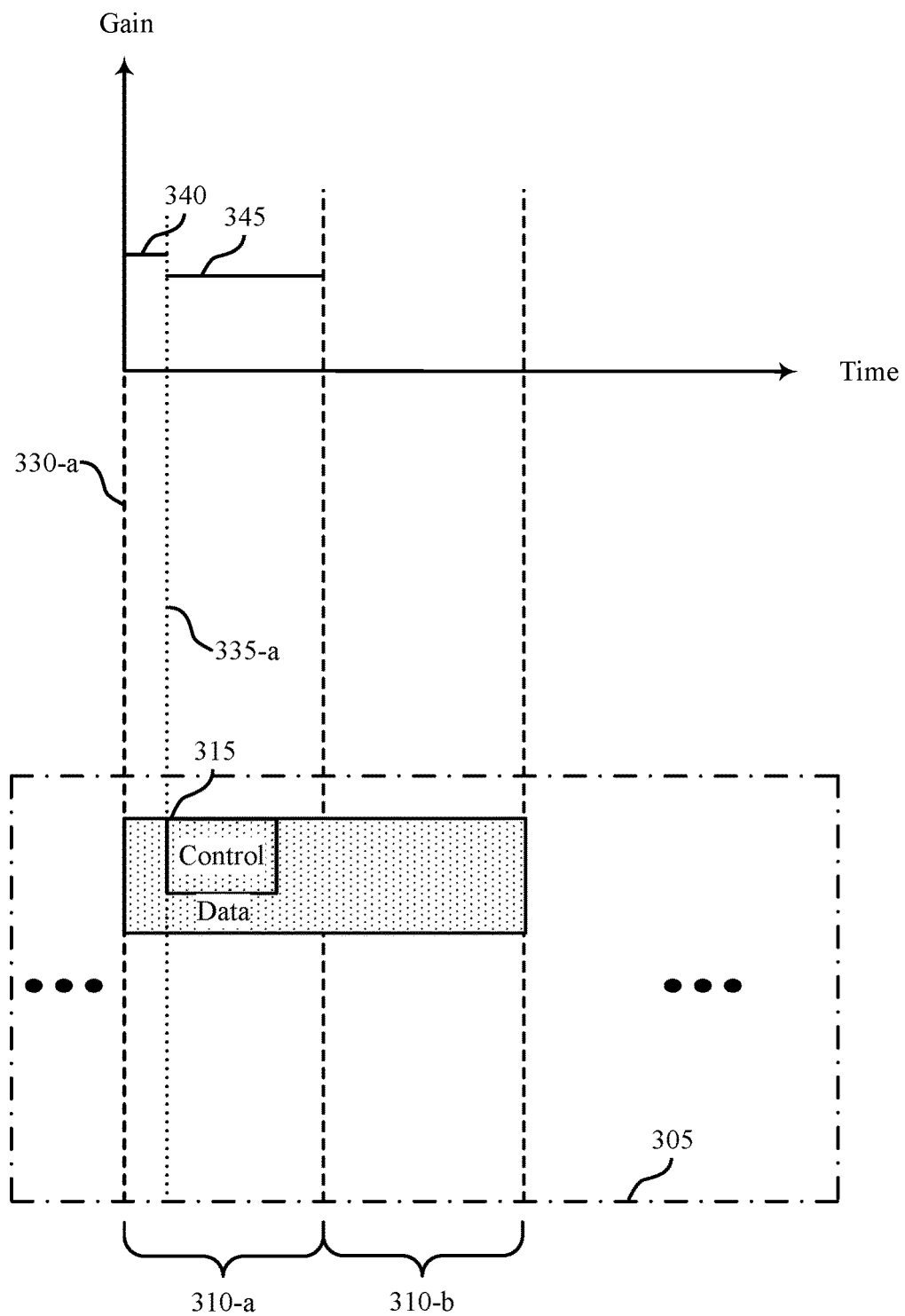
FIG. 3 illustrates an example of a transmission scheme that supports opportunistic transmission for sidelink communications in accordance with one or more aspects of the present disclosure.

FIG. 3 illustrates an example of a transmission scheme 300 that supports opportunistic transmission for sidelink communications in accordance with one or more aspects of the present disclosure. In some examples, the scheme 300 may implement aspects of wireless communications system 100. For instance, a first UE 115 (e.g., transmitting UE) may transmit a set of data (such as UE1 transmission 315). Although not described in FIG. 3, it may be understood that additional UEs may also transmit data to a receiving UE.

The transmission scheme 300 may include sidelink communication grid 305 including a number of slots 310 (such as slots 310-*a* and 310-*b*). Each UE transmission may span one or more slots 310. Additionally, a UE transmission may have a control region and a data region. As depicted in the example of FIG. 3, UE1 transmission 315 may be a UE transmission aggregated over multiple slots. In one example, the UE1 transmission 315 in a first slot 310-*a* may be a may be a UE transmission with a resource reservation for another slot 310 *b*.

At 330-*a*, the UE1 transmission 315 may arrive at a receiving UE 115. In between 330-*a* and 335-*a*, a receiver of the receiving UE 115 may receive the UE1 transmission 315 at a default initial gain. Additionally, in between 330-*a* and 335-*a*, the receiving UE 115 may perform an AGC on the UE1 transmission 315. The time period 340 spanning between 330-*a* and 335-*a* may represent an AGC setting time and may span one or more beginning symbols (e.g., a first symbol) of slot 310-*a*. At 335-*a*, the gain may switch to an updated gain value and the remaining symbols of slot 310-*a* during time period 345 may be received using the updated gain value.

In the example of FIG. 3, the transmitting UE 115 continuously transmits over slots 310-*a* and 310-*b*. In some cases, the transmitting UE 115 may determine that the receiving UE 115 will be able to predict a receive power (or a gain value) at slot 310-*b*, if the resource used for transmission by the transmitting UE 115 was reserved by the transmitting UE 115 (and indicated to the receiving UE 115) in slot 310-*a*. Additionally or alternatively, the transmitting UE 115 may determine that the receiving UE 115 will not be able to predict a receive power at slot 310-*b* if the resource used for transmission by the transmitting UE 115 was not reserved by the transmitting UE 115 in a prior slot 310-*a*. In some examples, the transmitting UE 115 may determine that the receiving UE 115 will be able to predict a receive power (or a gain value) at slot 310-*b*, if a transmission power used by the transmitting UE 115 for transmission in the previous slot 310-*a* is beyond a threshold than an expected transmission power for the transmission in a future slot (slot 310-*b*).

Figure 4:
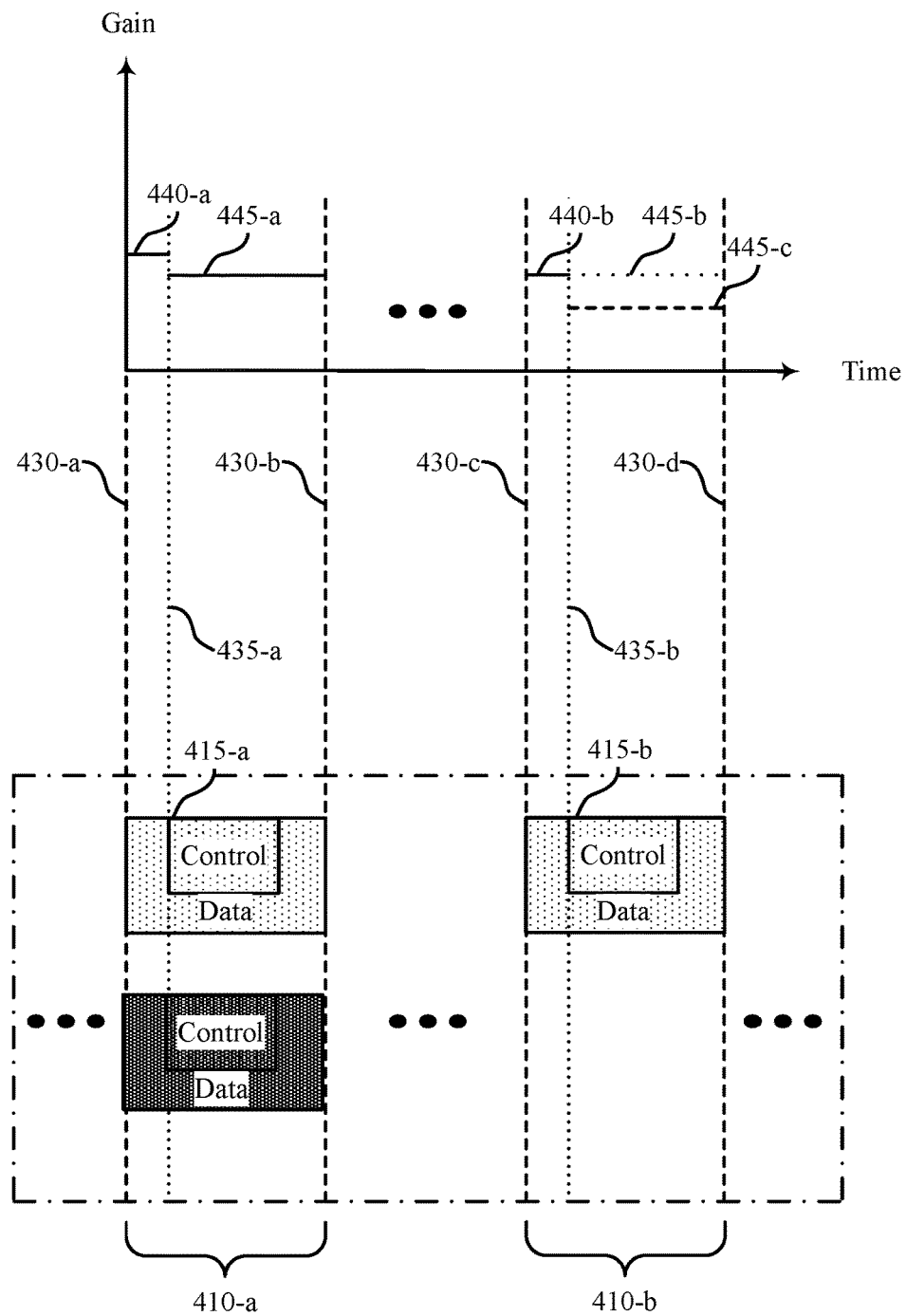
FIG. 4 illustrates an example of a transmission scheme that supports opportunistic transmission for sidelink communications in accordance with one or more aspects of the present disclosure.

FIG. 4 illustrates an example of a transmission scheme 400 that supports opportunistic transmission for sidelink communications in accordance with one or more aspects of the present disclosure. In some examples, the transmission scheme 400 may implement aspects of wireless communications system 100. For instance, a first UE 115 (or transmitting UE 115) may transmit UE1 transmission 415 and a second UE 115 (or transmitting UE 115) may transmit UE2 transmission 420. The transmission scheme 400 may include sidelink communication grid 405 composed of a number of slots 410. Each UE transmission may span a slot 410. Additionally, each UE transmission may have a control region and a data region.

At 430-*a*, UE1 transmission 415-*a* and UE2 transmission 420 may arrive at a receiving UE 115. In between 430-*a* and 435-*a*, a receiver of the receiving UE 115 may receive UE1 transmission 415 and UE2 transmission 420 at a default initial gain. Additionally, in time period 440-*a* spanning between 430-*a* and 435-*a*, the receiving UE 115 may perform AGC on UE1 transmission 415 and UE2 transmission 420. The time period 440-*a* spanning between 430-*a* and 435-*a* may represent an AGC setting time and may span one or more beginning symbols (e.g., a first symbol) of slot 410-*a*. At 435-*a*, the gain may switch to an updated gain value and the remaining symbols of slot 410-*a* during time period 445-*a* may be received using the updated gain value.

In one example, the control region of UE1 transmission 415-a may indicate a resource for the slot 410-b. As such, the receiving UE 115 may not determine a new gain for slot 410-b based on identifying the resource for the slot 410-b. In some examples, the transmitting UE 115 may determine that the receiving UE 115 will be able to predict a receive power (or a gain value) at slot 410-b, based on transmitting the resource reservation request in slot 410-a. At 430-b, UE1 transmission 415-a may cease and the gain of the receiver may return to the initial default gain (e.g., the gain at 430-a).

At 430-c, assuming that the receiving UE 115 can predict a receive power at slot 410-b, the receiving UE 115 may attempt to receive UE1 transmission 415-b. In such cases, the transmitting UE 115 may map one or more data bits in the symbols intended to carry dummy bits (e.g., reserved for AGC during time period 440-b spanning between 430-c and 435-b) at slot 410-b. In some cases, the receiving UE 115 may continue to use a predetermined gain value of slot 410-b for the remainder of the slot 410-b (e.g., time period 445-b). If the receiving UE 115 does not perform AGC (during time period 440-b) in slot 410-b, the predetermined gain value may be the gain value determined in slot 410-a. The receiving UE 115 may use the predetermined gain value to receive all symbols of UE1 transmission 415-b (during time period 445-b)). In some examples, if the receiving UE 115 successfully decodes UE1 transmission 415-b, the receiving UE 115 may transmit an acknowledgment (ACK) to the first UE 115. However, if the receiving UE 115 fails to decode UE1 transmission 415-b, the receiving UE 115 may transmit a negative acknowledgement (NACK) and may expect a retransmission of UE1 transmission 415-b at another slot 410, which may be indicated by a control region of UE1 transmission 415-b. Additionally or alternatively, the transmitting UE 115 may determine that the receiving UE 115 will be able to predict a receive power (or a gain value) at slot 410-b, if a transmission power for UE1 transmission 415-a is beyond a threshold than an expected transmission power for UE1 transmission 415-b.

In some examples, the transmitting UE 115 may determine that the receiving UE 115 will be able to predict a receive power (or a gain value) at slot 410-b, if the transmission power is adjusted from slot 410-a to slot 410-b based on a transmit power control command. That is, upon receiving the UE1 transmission 415-a, the receiving UE 115 may transmit a transmit power control command to the transmitting UE 115 (for example, in slot 410-a). Upon receiving the transmit power control command, the transmitting UE 115 may adjust the transmission power for the UE1 transmission 415-b. In such cases, the transmitting UE 115 determines that the receiving UE 115 may be able to predict an expected receive power for the UE1 transmission 415-b (during time period 445-c). At 430-d, UE1 transmission 415-b may cease and the gain of the receiver may return to the initial default gain (e.g., the gain at 430-a).

Figure 5:
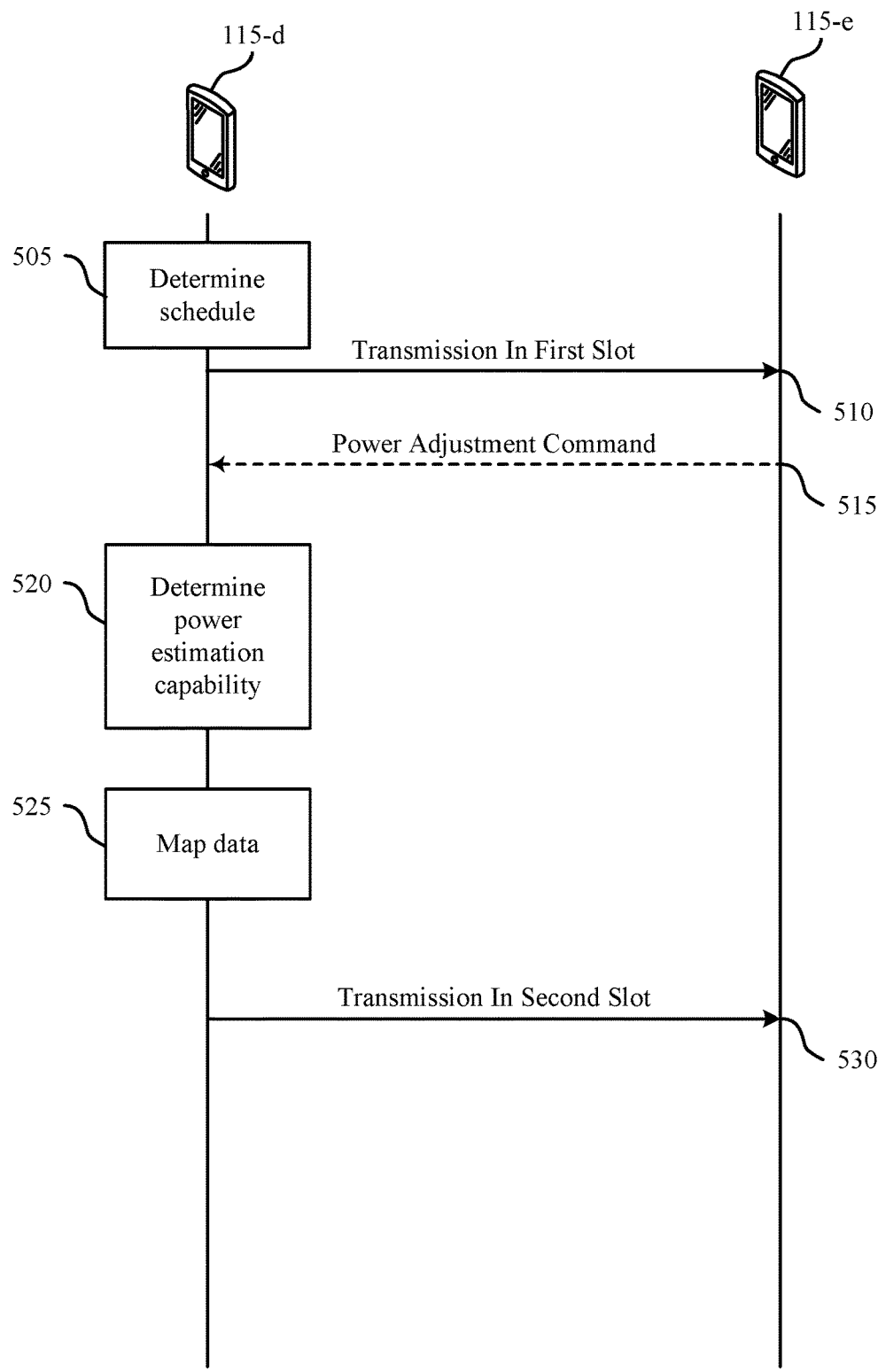
FIG. 5 illustrates an example of a process flow that supports opportunistic transmission for sidelink communications in accordance with one or more aspects of the present disclosure.

FIG. 5 illustrates an example of a process flow 500 that supports opportunistic transmission for sidelink communications in accordance with one or more aspects of the present disclosure. In some examples, the process flow 500 may implement aspects of wireless communications system 100. The process flow 500 may include UEs 115-d and 115-e, which may be examples of UEs 115 as described with reference to FIG. 5. For instance, the UE 115-d may be an example of a transmitting UE and the UE 115-e may be an example of a receiving UE in a sidelink communication system.

In the following description of the process flow 500, the operations between UEs 115-d and 115-e may be transmitted in a different order than the exemplary order shown. The operations performed by UEs 115-d and 115-e may be performed in different orders or at different times than the exemplary order shown. Certain operations may also be left out of the process flow 500, or other operations may be added to the process flow 500. Further, the UEs 115-d and 115-e are not meant to be representative, as the described features may be associated with any number of devices.

At 505, UE 115-d may determine that the UE 115-d is scheduled to transmit in a first slot and a second slot after the first slot. At 510, UE 115-d may transmit a first transmission based on determining that the UE 115-d is scheduled to transmit in the first slot and the second slot. The UE 115-e may receive the first transmission in the first slot. In some cases, the first transmission may include a first set of data in the first slot.

At 515, UE 115-d may optionally receive a command to adjust a first transmission power associated with the first transmission. In some examples, the command may include a transmit power control command.

At 520, UE 115-d may determine whether a power estimation capability of the UE 115-e satisfies a threshold. In some examples, the UE 115-d may make this determination determining, based on the transmission of the first set of data in the first slot and an upcoming transmission in the second slot. In one instance, the UE 115-d may identify a resource reservation associated with the upcoming transmission in the second slot. The UE 115-d may then transmit an indication of the resource reservation to the UE 115-e. The UE 115-d may determine that the power estimation capability of the UE 115-e satisfies the threshold based on transmitting the indication.

In some examples, the UE 115-d may identify a first transmission power associated with transmissions in the first slot and a second transmission power associated with the upcoming transmission in the second slot. The UE 115-d may determine that a difference between the first transmission power and the second transmission power satisfies a power threshold. In such examples, the UE 115-d may determine that the power estimation capability of the UE 115-e satisfies the threshold based on the difference. In some examples, upon receiving the power adjustment command at 515, the UE 115-d may adjust the second transmission power associated with the upcoming transmission in the second slot. The UE 115-d may then determine that the power estimation capability of the UE 115-e satisfies the threshold based on the adjusting.

At 525, the UE 115-d may map the data to the symbol at a temporal beginning of the second slot. At 530, the UE 115-d may transmit data in a symbol reserved for AGC at the second slot. In some cases, the UE 115-d may transmit the data based on based on the power estimation capability of the UE 115-e satisfying the threshold.

Figure 6:
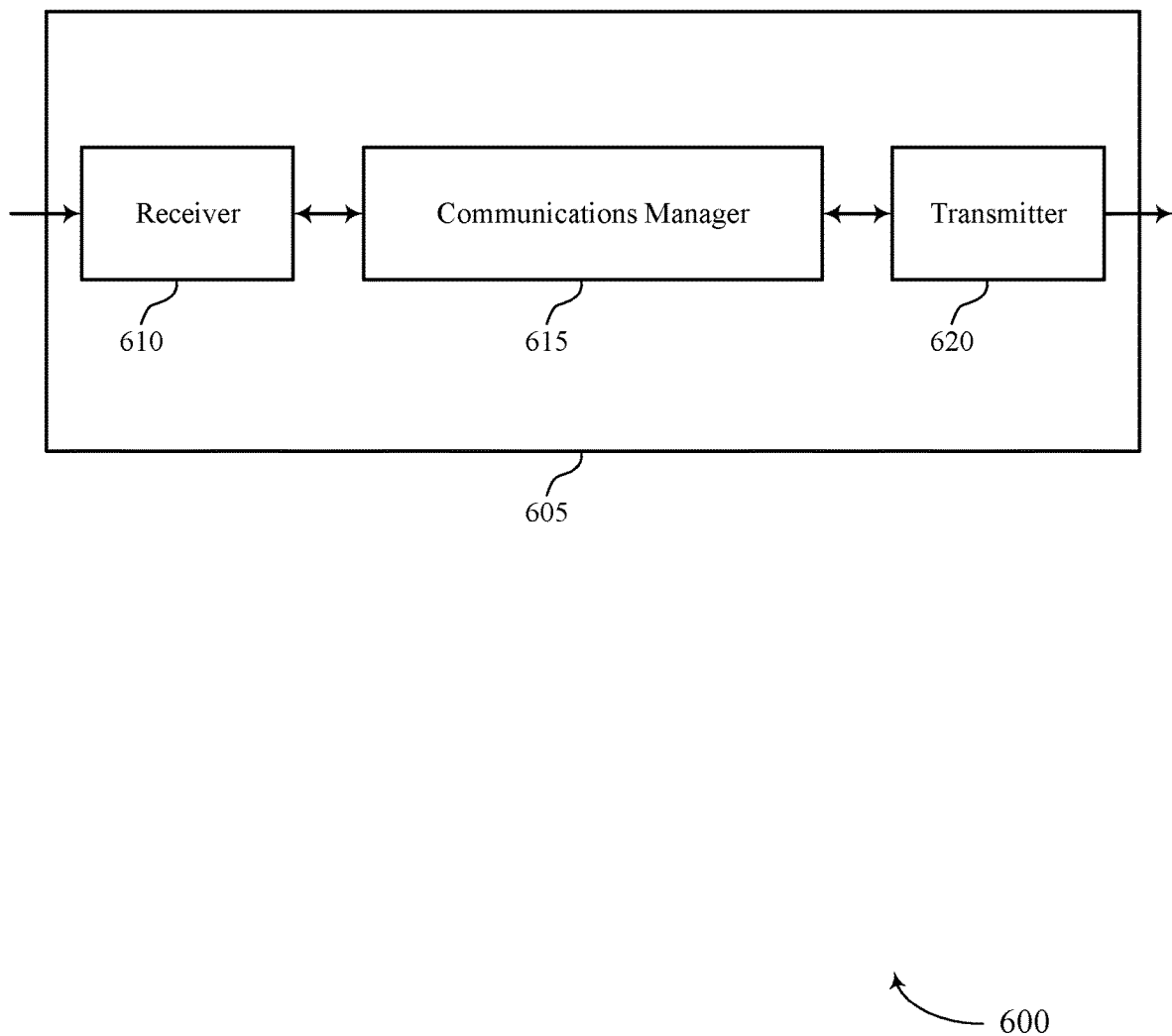
FIGS. 6 and 7 show block diagrams of devices that support opportunistic transmission for sidelink communications in accordance with one or more aspects of the present disclosure.

FIG. 6 shows a block diagram 600 of a device 605 that supports opportunistic transmission for sidelink communications in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to opportunistic transmission for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine that a first UE (or UE 115) is scheduled to transmit in a first slot and a second slot after the first slot, and transmit, to a second UE, a first set of data in the first slot based on determining that the first UE is scheduled to transmit in the first slot and the second slot. The communications manager 615 may transmit, based on the power estimation capability of the second UE satisfying the threshold, data in a symbol reserved for AGC at the second slot, and determine, based on the transmission of the first set of data in the first slot and an upcoming transmission in the second slot, whether a power estimation capability of the second UE satisfies a threshold. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
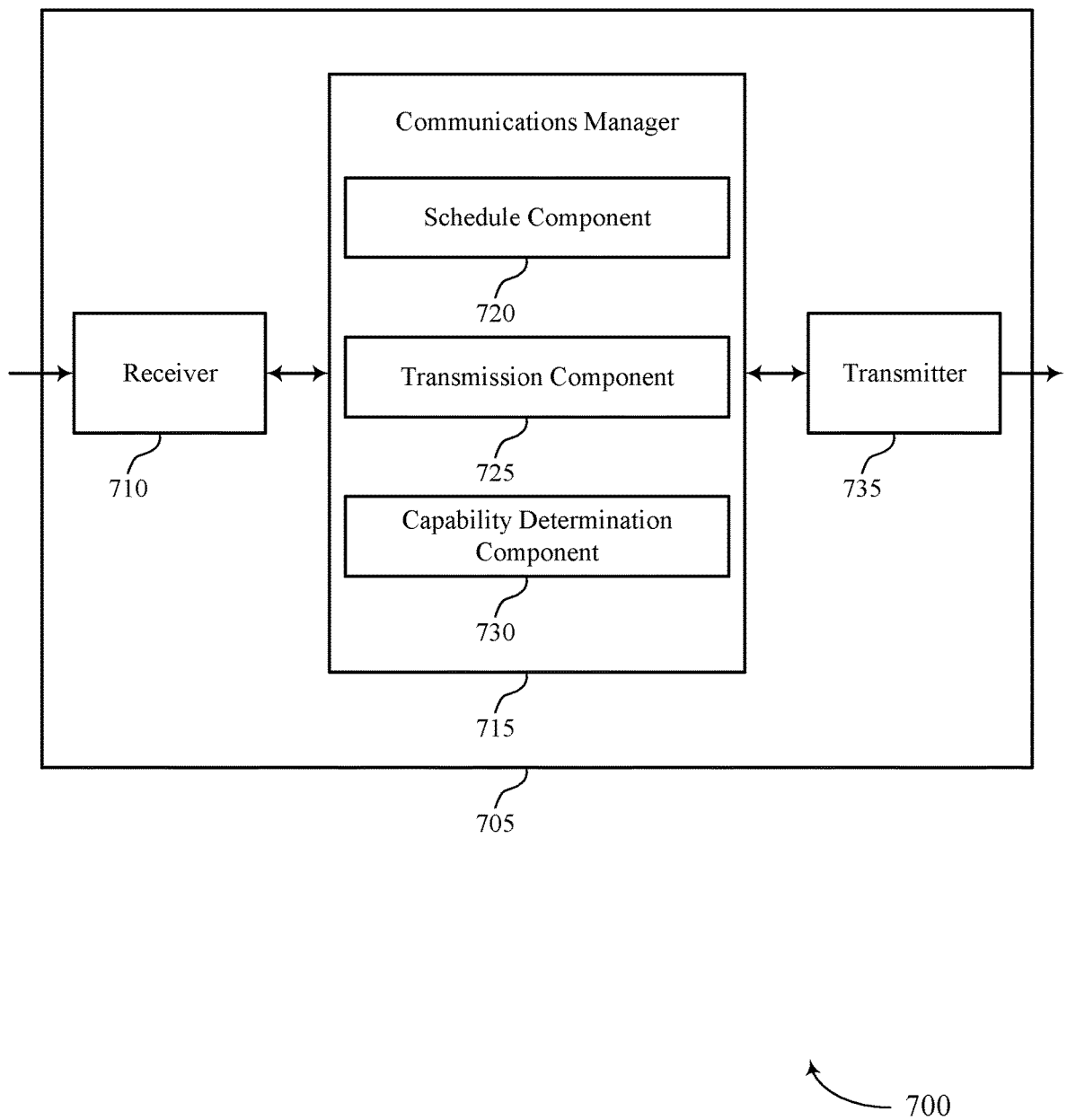

FIG. 7 shows a block diagram 700 of a device 705 that supports opportunistic transmission for sidelink communications in accordance with one or more aspects of the present disclosure. The device 705 may be an example of aspects of a device 605, or a UE 115 (such as a first UE) as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to opportunistic transmission for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a schedule component 720, a transmission component 725, and a capability determination component 730. The communications manager 715 may be an example of aspects of the communications manager 910 described herein.

The schedule component 720 may determine that the first UE is scheduled to transmit in a first slot and a second slot after the first slot. The transmission component 725 may transmit, to a second UE, a first set of data in the first slot based on determining that the first UE is scheduled to transmit in the first slot and the second slot. The capability determination component 730 may determine, based on the transmission of the first set of data in the first slot and an upcoming transmission in the second slot, whether a power estimation capability of the second UE satisfies a threshold. The transmission component 725 may transmit, based on the power estimation capability of the second UE satisfying the threshold, data in a symbol reserved for AGC at the second slot. In some cases, the first set of data includes an indication of the second slot.

In some cases, the first set of data includes a control transmission. In some cases, the second slot is immediately subsequent to the first slot, and where the indication of the second slot includes a number of slots over which the first UE intends to transmit. In some cases, at least one slot occurs between the first slot and the second slot. In some cases, the first slot and the second slot include an aggregated slot.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
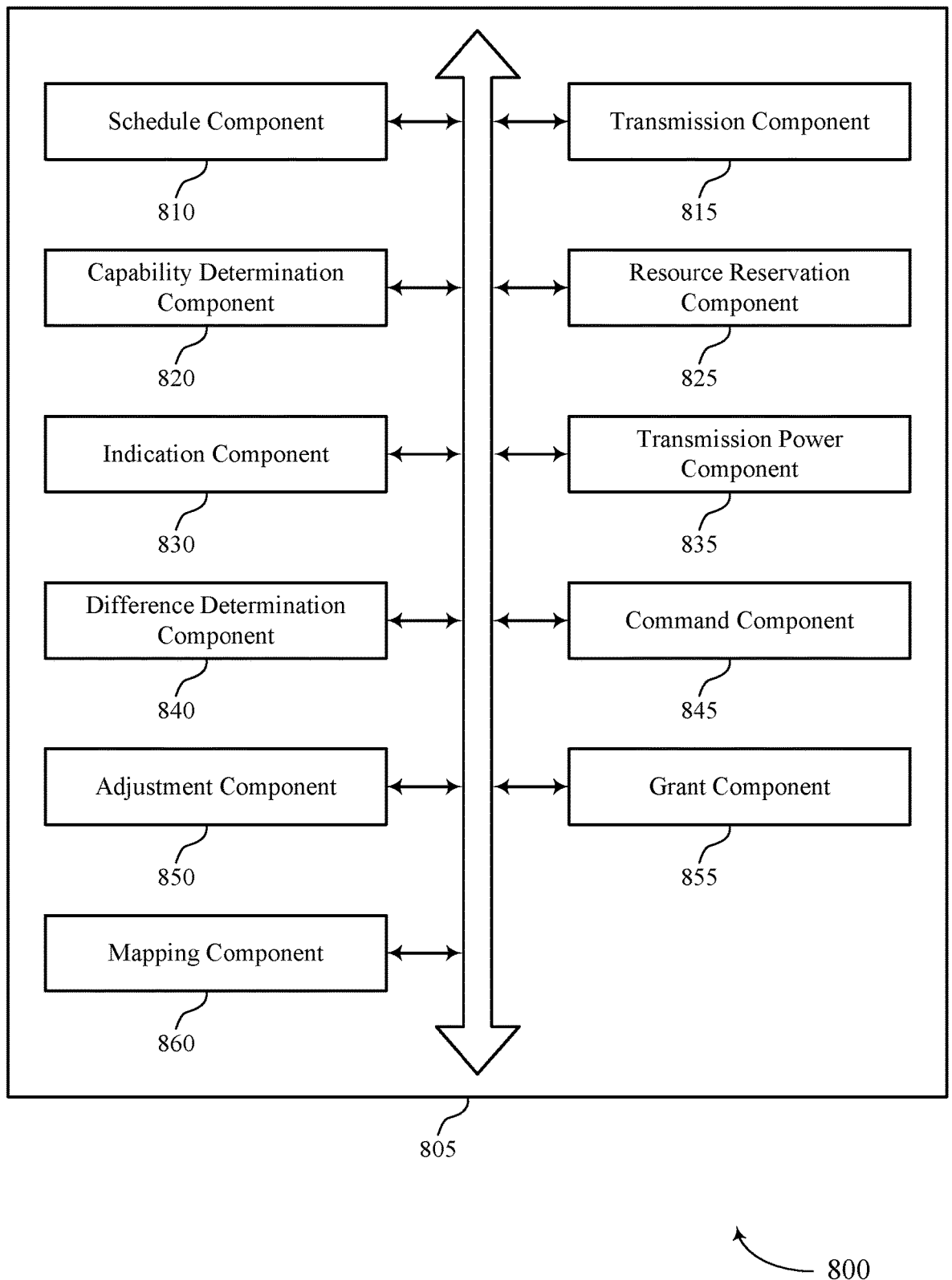
FIG. 8 shows a block diagram of a communications manager that supports opportunistic transmission for sidelink communications in accordance with one or more aspects of the present disclosure.

FIG. 8 shows a block diagram 800 of a communications manager 805 that supports opportunistic transmission for sidelink communications in accordance with one or more aspects of the present disclosure. The communications manager 805 may be an example of aspects of a communications manager 615, a communications manager 715, or a communications manager 910 described herein. The communications manager 805 may include a schedule component 810, a transmission component 815, a capability determination component 820, a resource reservation component 825, an indication component 830, a transmission power component 835, a difference determination component 840, a command component 845, an adjustment component 850, a grant component 855, and a mapping component 860. Each of these modules may communicate, directly or indirectly, with one another (e.g., via one or more buses).

The schedule component 810 may determine that a first UE (such as UE 115) is scheduled to transmit in a first slot and a second slot after the first slot. The transmission component 815 may transmit, to a second UE, a first set of data in the first slot based on determining that the first UE is scheduled to transmit in the first slot and the second slot. The capability determination component 820 may determine, based on the transmission of the first set of data in the first slot and an upcoming transmission in the second slot, whether a power estimation capability of the second UE satisfies a threshold. In some examples, the transmission component 815 may transmit, based on the power estimation capability of the second UE satisfying the threshold, data in a symbol reserved for AGC at the second slot.

The resource reservation component 825 may identify a resource reservation associated with the upcoming transmission in the second slot. The indication component 830 may transmit, to the second UE, an indication of the resource reservation. In some examples, the capability determination component 820 may determine that the power estimation capability of the second UE satisfies the threshold based on transmitting the indication. In some examples, the resource reservation component 825 may identify an absence of a resource reservation associated with the upcoming transmission in the second slot. In some examples, the capability determination component 820 may determine that the power estimation capability of the second UE does not satisfy the threshold based on the identifying. In some cases, the resource reservation associated with the upcoming transmission includes a reservation of resources for the upcoming transmission in the second slot.

The transmission power component 835 may identify a first transmission power associated with transmissions in the first slot. In some examples, the transmission power component 835 may identify a second transmission power associated with the upcoming transmission in the second slot. The difference determination component 840 may determine that a difference between the first transmission power and the second transmission power satisfies a second threshold. In some examples, the capability determination component 820 may determine that the power estimation capability of the second UE satisfies the threshold based on the difference.

In some examples, the transmission power component 835 may identify a first transmission power associated with the transmission of the first set of data. In some examples, the transmission power component 835 may identify a second transmission power associated with the upcoming transmission in the second slot. In some examples, the difference determination component 840 may determine that a difference between the first transmission power and the second transmission power does not satisfy a second threshold. In some examples, the capability determination component 820 may determine that the power estimation capability of the second UE does not satisfy the threshold based on the difference.

In some examples, the transmission power component 835 may identify a first transmission power associated with the transmission of the first set of data. The command component 845 may receive, from the second UE, a command to adjust the first transmission power. In some cases, the command includes a transmit power control command. The adjustment component 850 may adjust, based on receiving the command, a second transmission power associated with the upcoming transmission in the second slot. In some examples, the capability determination component 820 may determine that the power estimation capability of the second UE satisfies the threshold based on the adjusting.

The grant component 855 may receive, from a base station, a first grant associated with transmissions in the first slot. In some examples, the grant component 855 may receive, from the base station, a second grant associated with transmissions in the second slot. In some cases, the first grant and the second grant are a same grant. In some cases, the first grant and the second grant are different grants. In some examples, the capability determination component 820 may determine that the power estimation capability of the second UE satisfies the threshold based on the first grant and the second grant.

In some cases, the power estimation capability of the second UE includes an ability of the second UE to predict a received signal power associated with one or more transmissions in the second slot. In some cases, the power estimation capability of the second UE is further based on one or more of a total received signal power observed by the second UE in the first slot, an RSRP observed by the second UE for the first UE in the first slot, a spatial configuration used by the second UE for reception in the first slot, or a combination thereof.

The mapping component 860 may map the data to the symbol at a temporal beginning of the second slot, where transmitting the data is based on the mapping. In some cases, the data include coded data bits. In some cases, the total received signal power includes a received signal strength indicator for the first slot.

Figure 9:
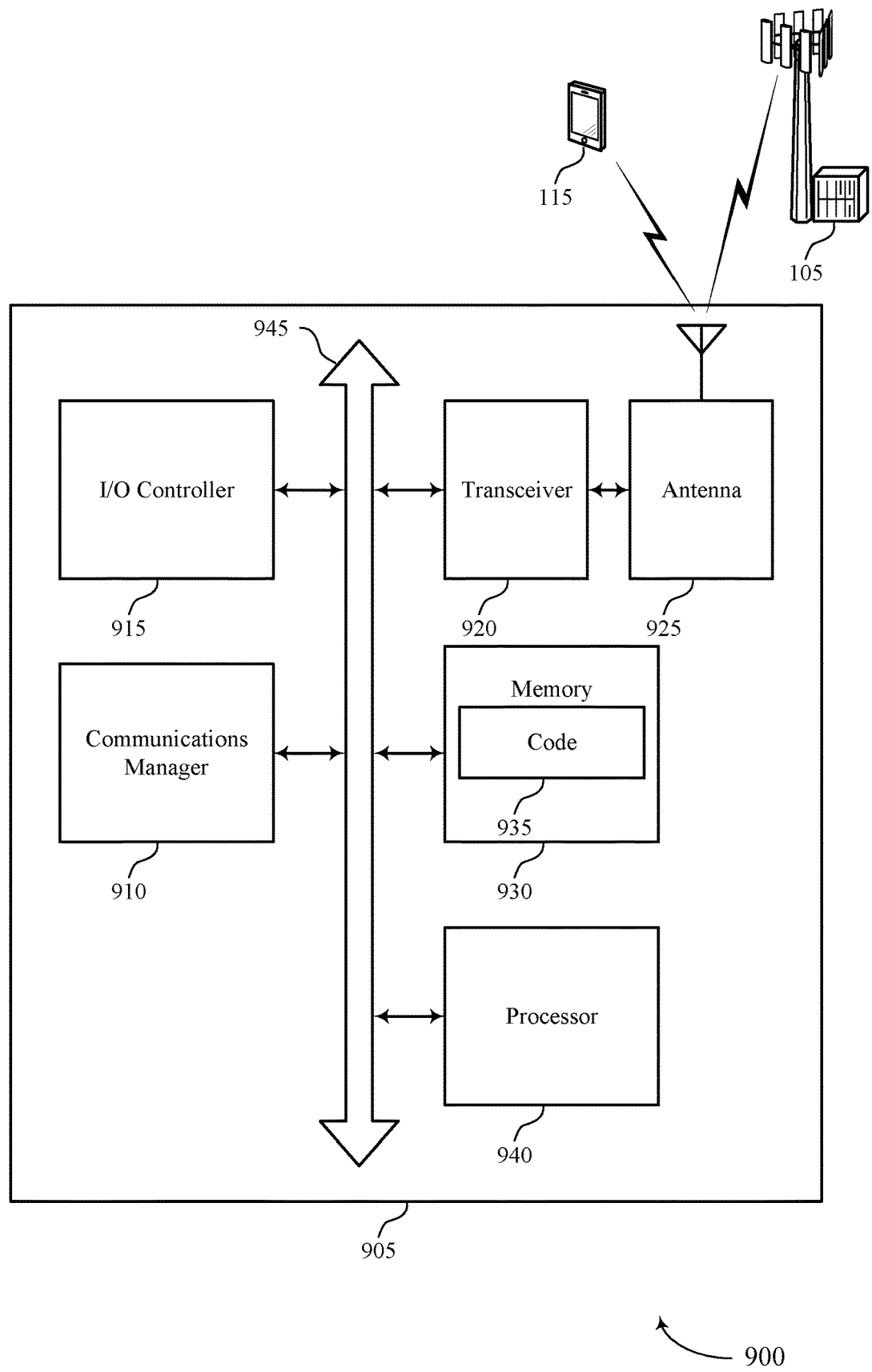
FIG. 9 shows a diagram of a system including a device that supports opportunistic transmission for sidelink communications in accordance with one or more aspects of the present disclosure.

FIG. 9 shows a diagram of a system 900 including a device 905 that supports opportunistic transmission for sidelink communications in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine that a first UE is scheduled to transmit in a first slot and a second slot after the first slot, transmit, to a second UE, a first set of data in the first slot based on determining that the first UE is scheduled to transmit in the first slot and the second slot, transmit, based on the power estimation capability of the second UE satisfying the threshold, data in a symbol reserved for AGC at the second slot, and determine, based on the transmission of the first set of data in the first slot and an upcoming transmission in the second slot, whether a power estimation capability of the second UE satisfies a threshold.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input output (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting opportunistic transmission for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
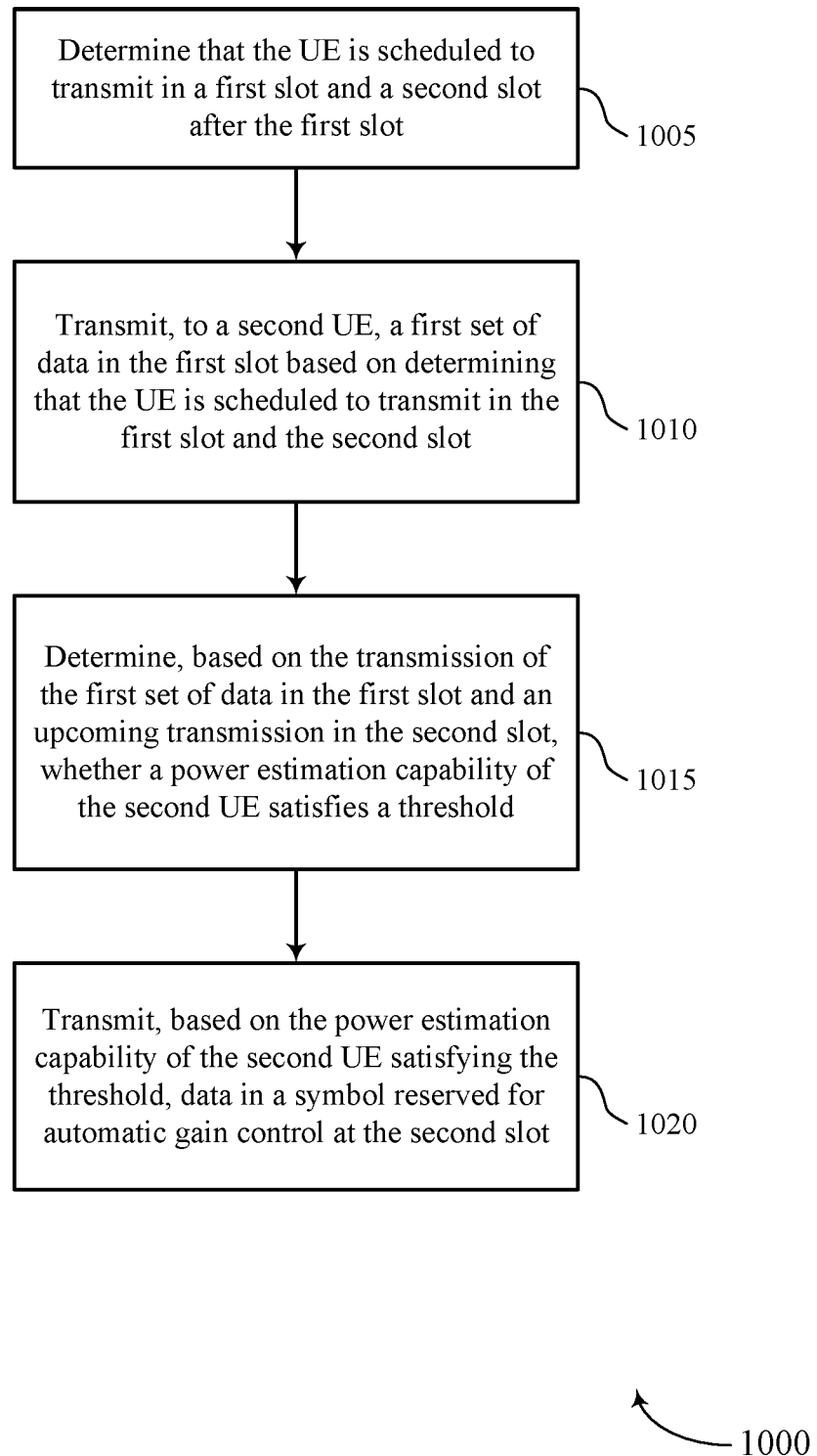
FIGS. 10 through 13 show flowcharts illustrating methods that support opportunistic transmission for sidelink communications in accordance with one or more aspects of the present disclosure.

FIG. 10 shows a flowchart illustrating a method 1000 that supports opportunistic transmission for sidelink communications in accordance with one or more aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may determine that the UE is scheduled to transmit in a first slot and a second slot after the first slot. The operations of 1005 may be performed according to the methods described herein. In some examples, aspects of the operations of 1005 may be performed by a schedule component as described with reference to FIGS. 6 through 9.

At 1010, the UE may transmit, to a second UE, a first set of data in the first slot based on determining that the UE is scheduled to transmit in the first slot and the second slot. The operations of 1010 may be performed according to the methods described herein. In some examples, aspects of the operations of 1010 may be performed by a transmission component as described with reference to FIGS. 6 through 9.

At 1015, the UE may determine, based on the transmission of the first set of data in the first slot and an upcoming transmission in the second slot, whether a power estimation capability of the second UE satisfies a threshold. The operations of 1015 may be performed according to the methods described herein. In some examples, aspects of the operations of 1015 may be performed by a capability determination component as described with reference to FIGS. 6 through 9.

At 1020, the UE may transmit, based on the power estimation capability of the second UE satisfying the threshold, data in a symbol reserved for AGC at the second slot. The operations of 1020 may be performed according to the methods described herein. In some examples, aspects of the operations of 1020 may be performed by a transmission component as described with reference to FIGS. 6 through 9.

Figure 11:
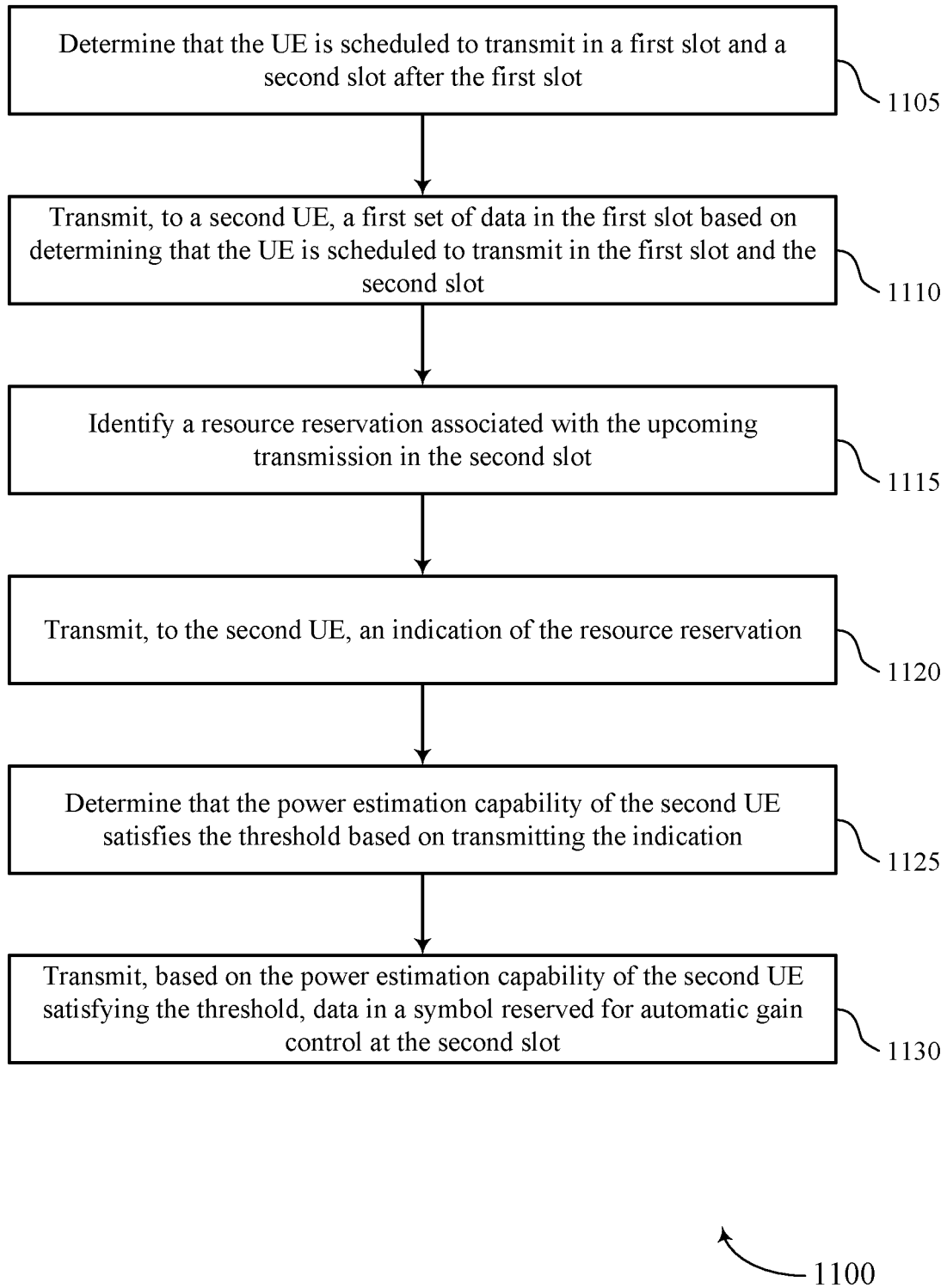

FIG. 11 shows a flowchart illustrating a method 1100 that supports opportunistic transmission for sidelink communications in accordance with one or more aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may determine that the UE is scheduled to transmit in a first slot and a second slot after the first slot. The operations of 1105 may be performed according to the methods described herein. In some examples, aspects of the operations of 1105 may be performed by a schedule component as described with reference to FIGS. 6 through 9.

At 1110, the UE may transmit, to a second UE, a first set of data in the first slot based on determining that the UE is scheduled to transmit in the first slot and the second slot. The operations of 1110 may be performed according to the methods described herein. In some examples, aspects of the operations of 1110 may be performed by a transmission component as described with reference to FIGS. 6 through 9.

At 1115, the UE may identify a resource reservation associated with the upcoming transmission in the second slot. The operations of 1115 may be performed according to the methods described herein. In some examples, aspects of the operations of 1115 may be performed by a resource reservation component as described with reference to FIGS. 6 through 9.

At 1120, the UE may transmit, to the second UE, an indication of the resource reservation. The operations of 1120 may be performed according to the methods described herein. In some examples, aspects of the operations of 1120 may be performed by an indication component as described with reference to FIGS. 6 through 9.

At 1125, the UE may determine that the power estimation capability of the second UE satisfies the threshold based on transmitting the indication. The operations of 1125 may be performed according to the methods described herein. In some examples, aspects of the operations of 1125 may be performed by a capability determination component as described with reference to FIGS. 6 through 9.

At 1130, the UE may transmit, based on the power estimation capability of the second UE satisfying the threshold, data in a symbol reserved for AGC at the second slot. The operations of 1130 may be performed according to the methods described herein. In some examples, aspects of the operations of 1130 may be performed by a transmission component as described with reference to FIGS. 6 through 9.

Figure 12:
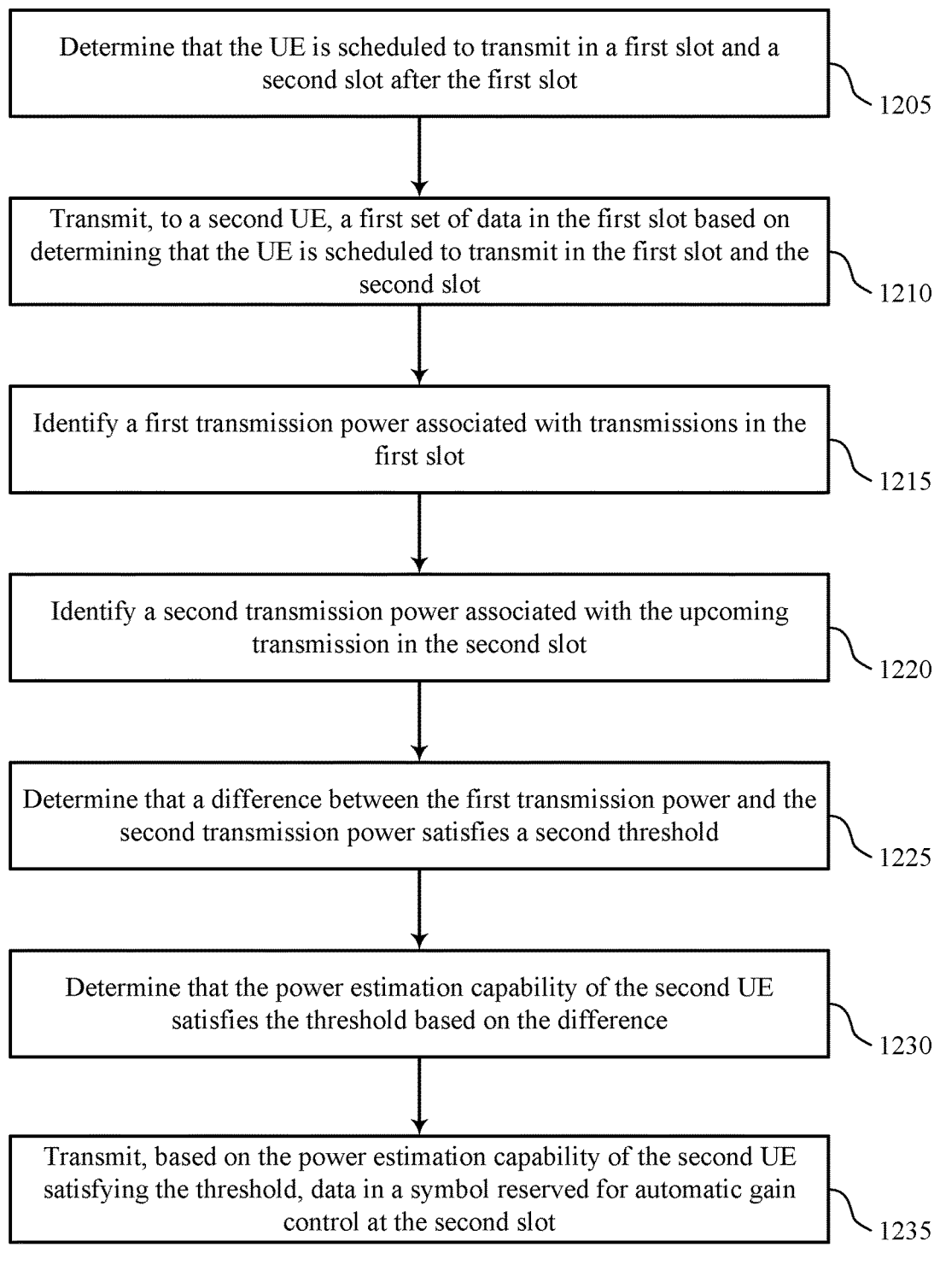

FIG. 12 shows a flowchart illustrating a method 1200 that supports opportunistic transmission for sidelink communications in accordance with one or more aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may determine that the UE is scheduled to transmit in a first slot and a second slot after the first slot. The operations of 1205 may be performed according to the methods described herein. In some examples, aspects of the operations of 1205 may be performed by a schedule component as described with reference to FIGS. 6 through 9.

At 1210, the UE may transmit, to a second UE, a first set of data in the first slot based on determining that the UE is scheduled to transmit in the first slot and the second slot. The operations of 1210 may be performed according to the methods described herein. In some examples, aspects of the operations of 1210 may be performed by a transmission component as described with reference to FIGS. 6 through 9.

At 1215, the UE may identify a first transmission power associated with transmissions in the first slot. The operations of 1215 may be performed according to the methods described herein. In some examples, aspects of the operations of 1215 may be performed by a transmission power component as described with reference to FIGS. 6 through 9.

At 1220, the UE may identify a second transmission power associated with the upcoming transmission in the second slot. The operations of 1220 may be performed according to the methods described herein. In some examples, aspects of the operations of 1220 may be performed by a transmission power component as described with reference to FIGS. 6 through 9.

At 1225, the UE may determine that a difference between the first transmission power and the second transmission power satisfies a second threshold. The operations of 1225 may be performed according to the methods described herein. In some examples, aspects of the operations of 1225 may be performed by a difference determination component as described with reference to FIGS. 6 through 9.

At 1230, the UE may determine that the power estimation capability of the second UE satisfies the threshold based on the difference. The operations of 1230 may be performed according to the methods described herein. In some examples, aspects of the operations of 1230 may be performed by a capability determination component as described with reference to FIGS. 6 through 9.

At 1235, the UE may transmit, based on the power estimation capability of the second UE satisfying the threshold, data in a symbol reserved for AGC at the second slot. The operations of 1235 may be performed according to the methods described herein. In some examples, aspects of the operations of 1235 may be performed by a transmission component as described with reference to FIGS. 6 through 9.

Figure 13:
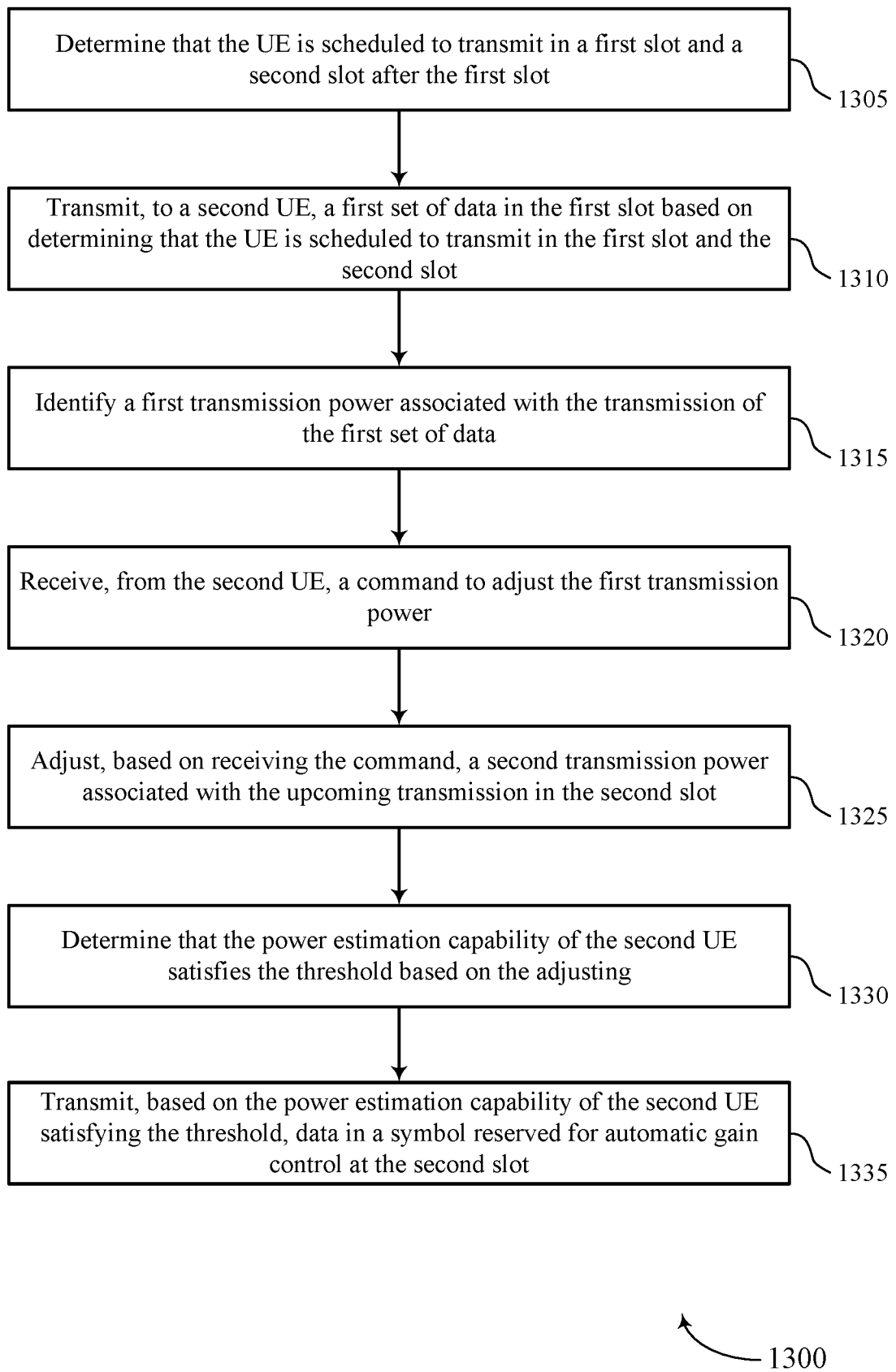

FIG. 13 shows a flowchart illustrating a method 1300 that supports opportunistic transmission for sidelink communications in accordance with one or more aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may determine that the UE is scheduled to transmit in a first slot and a second slot after the first slot. The operations of 1305 may be performed according to the methods described herein. In some examples, aspects of the operations of 1305 may be performed by a schedule component as described with reference to FIGS. 6 through 9.

At 1310, the UE may transmit, to a second UE, a first set of data in the first slot based on determining that the UE is scheduled to transmit in the first slot and the second slot. The operations of 1310 may be performed according to the methods described herein. In some examples, aspects of the operations of 1310 may be performed by a transmission component as described with reference to FIGS. 6 through 9.

At 1315, the UE may identify a first transmission power associated with the transmission of the first set of data. The operations of 1315 may be performed according to the methods described herein. In some examples, aspects of the operations of 1315 may be performed by a transmission power component as described with reference to FIGS. 6 through 9.

At 1320, the UE may receive, from the second UE, a command to adjust the first transmission power. The operations of 1320 may be performed according to the methods described herein. In some examples, aspects of the operations of 1320 may be performed by a command component as described with reference to FIGS. 6 through 9.

At 1325, the UE may adjust, based on receiving the command, a second transmission power associated with the upcoming transmission in the second slot. The operations of 1325 may be performed according to the methods described herein. In some examples, aspects of the operations of 1325 may be performed by an adjustment component as described with reference to FIGS. 6 through 9.

At 1330, the UE may determine that the power estimation capability of the second UE satisfies the threshold based on the adjusting. The operations of 1330 may be performed according to the methods described herein. In some examples, aspects of the operations of 1330 may be performed by a capability determination component as described with reference to FIGS. 6 through 9.

At 1335, the UE may transmit, based on the power estimation capability of the second UE satisfying the threshold, data in a symbol reserved for AGC at the second slot. The operations of 1335 may be performed according to the methods described herein. In some examples, aspects of the operations of 1335 may be performed by a transmission component as described with reference to FIGS. 6 through 9.

It should be noted that the methods described herein describe possible implementations, and that the operations and the operations may be rearranged or otherwise modified and that other implementations are possible. Further, aspects from two or more of the methods may be combined.

The following provides an overview of examples of the present disclosure:

Example 1: A method for wireless communication at a first UE, comprising: transmitting, to a second UE, a first set of data in a first slot; determining, based at least in part on the transmission of the first set of data in the first slot and an upcoming transmission in a second slot, whether a power estimation capability of the second UE satisfies a threshold; and transmitting, based at least in part on the power estimation capability of the second UE satisfying the threshold, data in a symbol reserved for AGC at the second slot.

Example 2: The method of example 1, wherein the symbol reserved for AGC at the second slot is located at a temporal beginning of the second slot.

Example 3: The method of any of examples 1 and 2, further comprising: receiving, from the second UE, an indication of an ability of the second UE to predict a received signal power, wherein transmitting the data in the symbol reserved for AGC is based at least in part on the received indication.

Example 4: The method of any of examples 1 through 3, wherein the power estimation capability of the second UE comprises an ability of the second UE to predict a received signal power associated with one or more transmissions in the second slot.

Example 5: The method of example 4, wherein the power estimation capability of the second UE is further based at least in part on one or more of a total received signal power observed by the second UE in the first slot, a reference signal received power observed by the second UE for the first UE in the first slot, a spatial configuration used by the second UE for reception in the first slot, or a combination thereof.

Example 6: The method of example 5, wherein the total received signal power comprises a received signal strength indicator for the first slot.

Example 7: The method of any of examples 1 through 6, the determining comprising: identifying a resource reservation associated with the upcoming transmission in the second slot; transmitting, to the second UE, an indication of the resource reservation; and determining that the power estimation capability of the second UE satisfies the threshold based at least in part on transmitting the indication.

Example 8: The method of any of examples 1 through 6, the determining comprising: identifying an absence of a resource reservation associated with the upcoming transmission in the second slot; and determining that the power estimation capability of the second UE does not satisfy the threshold based at least in part on the identifying.

Example 9: The method of example 8, wherein the resource reservation associated with the upcoming transmission comprises a reservation of resources for the upcoming transmission in the second slot.

Example 10: The method of any of examples 1 through 6, the determining comprising: identifying a first transmission power associated with transmissions in the first slot; identifying a second transmission power associated with the upcoming transmission in the second slot; determining that a difference between the first transmission power and the second transmission power satisfies a second threshold; and determining that the power estimation capability of the second UE satisfies the threshold based at least in part on the difference.

Example 11: The method of any of examples 1 through 6, the determining comprising: identifying a first transmission power associated with transmissions in the first slot; identifying a second transmission power associated with the upcoming transmission in the second slot; determining that a difference between the first transmission power and the second transmission power does not satisfy a second threshold; and determining that the power estimation capability of the second UE does not satisfy the threshold based at least in part on the difference.

Example 12: The method of any of examples 1 through 6, the determining comprising: identifying a first transmission power associated with the transmission of the first set of data; receiving, from the second UE, a command to adjust the first transmission power; adjusting, based at least in part on receiving the command, a second transmission power associated with the upcoming transmission in the second slot; and determining that the power estimation capability of the second UE satisfies the threshold based at least in part on the adjusting.

Example 13: The method of example 12, wherein the command comprises a transmit power control command.

Example 14: The method of any of examples 1 through 6, the determining comprising: receiving, from a base station, a first grant associated with transmissions in the first slot; receiving, from the base station, a second grant associated with transmissions in the second slot; and determining that the power estimation capability of the second UE satisfies the threshold based at least in part on the first grant and the second grant.

Example 15: The method of example 14, wherein the first grant and the second grant are a same grant.

Example 16: The method of example 14, wherein the first grant and the second grant are different grants.

Example 17: The method of any of examples of 1 through 16, further comprising: mapping the data to the symbol at a temporal beginning of the first slot or the second slot, wherein transmitting the data is based at least in part on the mapping.

Example 18: The method of example 17, wherein the data in the symbol reserved for AGC comprise coded data bits different from coded data bits associated with AGC.

Example 19: The method of any of examples 1 through 18, wherein the first set of data comprises an indication of the second slot.

Example 20: The method of example 19, wherein the second slot is immediately subsequent to the first slot, and wherein the indication of the second slot comprises a number of slots over which the first UE intends to transmit.

Example 21: The method of any of examples 1 through 20, wherein at least one slot occurs between the first slot and the second slot.

Example 22: The method of any of examples 1 through 21, wherein the first slot and the second slot comprise an aggregated slot.

Example 23: An apparatus for wireless communication comprising at least one means for performing a method of any one of examples 1 through 22.

Example 24: An apparatus for wireless communication comprising a processor and memory coupled to the processor. The processor and memory configured to perform a method of any one of examples 1 through 22.

Example 25: A non-transitory computer-readable medium storing code for wireless communication comprising a processor, memory coupled with the processor, and instructions stored in the memory and executable by the processor to cause the apparatus to perform a method of any one of examples 1 through 22.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc.

CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment, comprising:
    transmitting, to a second user equipment, a first set of data in a first slot;
    receiving, from the second user equipment, an indication of a power estimation capability comprising an ability of the second user equipment to predict a received signal power of a transmission in a second slot, the predicted received signal power being based at least in part on one or more parameters received in the first slot;
    determining, by the first user equipment based at least in part on a transmission power of the first set of data in the first slot and a transmission power of an upcoming transmission in the second slot, that the power estimation capability of the second user equipment satisfies a threshold; and
    transmitting, based at least in part on the power estimation capability of the second user equipment satisfying the threshold, a second set of data in a symbol reserved for automatic gain control at the second slot.

2. The method of claim 1, wherein the symbol reserved for automatic gain control at the second slot is located at a temporal beginning of the second slot.

3. The method of claim 1, wherein the power estimation capability of the second user equipment comprises an ability of the second user equipment to predict a received signal power associated with one or more additional transmissions in the second slot.

4. The method of claim 1, wherein the power estimation capability of the second user equipment is further based at least in part on one or more of a total received signal power observed by the second user equipment in the first slot, a reference signal received power observed by the second user equipment for the first user equipment in the first slot, a spatial configuration used by the second user equipment for reception in the first slot, or a combination thereof.

5. The method of claim 4, wherein the total received signal power comprises a received signal strength indicator for the first slot.

6. The method of claim 1, the determining comprising:
    identifying a resource reservation associated with the upcoming transmission in the second slot;
    transmitting, to the second user equipment, an indication of the resource reservation; and
    determining that the power estimation capability of the second user equipment satisfies the threshold based at least in part on transmitting the indication of the resource reservation.

7. The method of claim 1, the determining comprising:
    identifying an absence of a resource reservation associated with the upcoming transmission in the second slot; and
    determining that the power estimation capability of the second user equipment does not satisfy the threshold based at least in part on the identifying.

8. The method of claim 7, wherein the resource reservation associated with the upcoming transmission comprises a reservation of one or more resources for the upcoming transmission in the second slot.

9. The method of claim 1, the determining comprising:
    identifying a first transmission power associated with transmissions in the first slot;
    identifying a second transmission power associated with the upcoming transmission in the second slot;
    determining that a difference between the first transmission power and the second transmission power satisfies a second threshold; and
    determining that the power estimation capability of the second user equipment satisfies the threshold based at least in part on the difference.

10. The method of claim 1, the determining comprising:
    identifying a first transmission power associated with transmissions in the first slot;
    identifying a second transmission power associated with the upcoming transmission in the second slot;
    determining that a difference between the first transmission power and the second transmission power does not satisfy a second threshold; and
    determining that the power estimation capability of the second user equipment does not satisfy the threshold based at least in part on the difference.

11. The method of claim 1, the determining comprising:
    identifying a first transmission power associated with the transmission of the first set of data;
    receiving, from the second user equipment, a command to adjust the first transmission power;
    adjusting, based at least in part on the received command, a second transmission power associated with the upcoming transmission in the second slot; and
    determining that the power estimation capability of the second user equipment satisfies the threshold based at least in part on the adjusting.

12. The method of claim 11, wherein the command comprises a transmit power control command.

13. The method of claim 1, the determining comprising:
receiving a first grant associated with transmissions in the first slot;
  receiving a second grant associated with transmissions in the second slot; and
  determining that the power estimation capability of the second user equipment satisfies the threshold based at least in part on the first grant and the second grant.

14. The method of claim 13, wherein the first grant and the second grant are a same grant.

15. The method of claim 13, wherein the first grant and the second grant are different grants.

16. The method of claim 1, further comprising:
mapping the second set of data to the symbol at a temporal beginning of the first slot or the second slot, wherein transmitting the second set of data is based at least in part on the mapping.

17. The method of claim 16, wherein the second set of data in the symbol reserved for automatic gain control comprises coded data bits different from coded data bits associated with automatic gain control.

18. The method of claim 1, wherein the first set of data comprises an indication of the second slot.

19. The method of claim 18, wherein the second slot is immediately subsequent to the first slot, and wherein the indication of the second slot comprises a number of slots for which the first user equipment intends to transmit.

20. The method of claim 18, wherein the first set of data comprises a control transmission.

21. The method of claim 1, wherein at least one slot occurs between the first slot and the second slot.

22. The method of claim 1, wherein the first slot and the second slot comprise an aggregated slot.

23. An apparatus for wireless communication, comprising:
  at least one processor; and
  at least one memory coupled with the at least one processor, the at least one processor configured to:
  transmit, to a second user equipment, a first set of data in a first slot;
  receive, from the second user equipment, an indication of a power estimation capability comprising an ability of the second user equipment to predict a received signal power of a transmission in a second slot, the predicted received signal power being based at least in part on one or more parameters received in the first slot;
  determine, by the apparatus based at least in part on a transmission power of the first set of data in the first slot and a transmission power of an upcoming transmission in the second slot, that the power estimation capability of the second user equipment satisfies a threshold; and
  transmit, based at least in part on the power estimation capability of the second user equipment satisfying the threshold, a second set of data in a symbol reserved for automatic gain control at the second slot.

24. The apparatus of claim 23, wherein the symbol reserved for automatic gain control at the second slot is located at a temporal beginning of the second slot.

25. The apparatus of claim 23, wherein the power estimation capability of the second user equipment comprises an ability of the second user equipment to predict a received signal power associated with one or more additional transmissions in the second slot.

26. The apparatus of claim 25, wherein the power estimation capability of the second user equipment is further based at least in part on one or more of a total received signal power observed by the second user equipment in the first slot, a reference signal received power observed by the second user equipment for a first user equipment in the first slot, a spatial configuration used by the second user equipment for reception in the first slot, or a combination thereof.

27. The apparatus of claim 23, wherein, to determine, the at least one processor is configured to:
  identify a resource reservation associated with the upcoming transmission in the second slot;
  transmit, to the second user equipment, an indication of the resource reservation; and
  determine that the power estimation capability of the second user equipment satisfies the threshold based at least in part on transmitting the indication of the resource reservation.

28. The apparatus of claim 23, wherein, to determine, the at least one processor is configured to:
  identify an absence of a resource reservation associated with the upcoming transmission in the second slot; and
  determine that the power estimation capability of the second user equipment does not satisfy the threshold based at least in part on the identifying.

29. The apparatus of claim 28, wherein the resource reservation associated with the upcoming transmission comprises a reservation of one or more resources for the upcoming transmission in the second slot.

30. The apparatus of claim 23, wherein, to determine, the at least one processor is configured to:
  identify a first transmission power associated with transmissions in the first slot;
  identify a second transmission power associated with the upcoming transmission in the second slot;
  determine that a difference between the first transmission power and the second transmission power satisfies a second threshold; and
  determine that the power estimation capability of the second user equipment satisfies the threshold based at least in part on the difference.

31. The apparatus of claim 23, wherein, to determine, the at least one processor is configured to:
  identify a first transmission power associated with transmissions in the first slot;
  identify a second transmission power associated with the upcoming transmission in the second slot;
  determine that a difference between the first transmission power and the second transmission power does not satisfy a second threshold; and
  determine that the power estimation capability of the second user equipment does not satisfy the threshold based at least in part on the difference.

32. The apparatus of claim 23, wherein, to determine, the at least one processor is configured to:
  identify a first transmission power associated with the transmission of the first set of data;
  receive, from the second user equipment, a command to adjust the first transmission power;
  adjust, based at least in part on the received command, a second transmission power associated with the upcoming transmission in the second slot; and
  determine that the power estimation capability of the second user equipment satisfies the threshold based at least in part on the adjusting.

33. The apparatus of claim 23, wherein, to determine, the at least one processor is configured to:
  receive a first grant associated with transmissions in the first slot;
  receive a second grant associated with transmissions in the second slot; and determine that the power estimation capability of the second user equipment satisfies the threshold based at least in part on the first grant and the second grant.

34. The apparatus of claim 23, wherein the first set of data comprises a control transmission.

35. An apparatus for wireless communications at a first user equipment, comprising:
  means for transmitting, to a second user equipment, a first set of data in a first slot;
  means for receiving, from the second user equipment, an indication of a power estimation capability comprising an ability of the second user equipment to predict a received signal power of a transmission in a second slot, the predicted received signal power being based at least in part on one or more parameters received in the first slot;
  means for determining, by the first user equipment based at least in part on a transmission power of the first set of data in the first slot and a transmission power of an upcoming transmission in the second slot, that the power estimation capability of the second user equipment satisfies a threshold; and
  means for transmitting, based at least in part on the power estimation capability of the second user equipment satisfying the threshold, a second set of data in a symbol reserved for automatic gain control at the second slot.

36. The apparatus of claim 35, wherein the symbol reserved for automatic gain control at the second slot is located at a temporal beginning of the second slot.

37. A non-transitory computer-readable medium storing code for wireless communications at a first user equipment, the code comprising instructions executable by at least one processor to:
  transmit, to a second user equipment, a first set of data in a first slot;
  receive, from the second user equipment, an indication of a power estimation capability comprising an ability of the second user equipment to predict a received signal power of a transmission in a second slot, the predicted received signal power being based at least in part on one or more parameters received in the first slot;
  determine, by the first user equipment based at least in part on a transmission power of the first set of data in the first slot and a transmission power of an upcoming transmission in the second slot, that the power estimation capability of the second user equipment satisfies a threshold; and
  transmit, based at least in part on the power estimation capability of the second user equipment satisfying the threshold, a second set of data in a symbol reserved for automatic gain control at the second slot.

38. The non-transitory computer-readable medium of claim 37, wherein the instructions are further executable by the at least one processor to:
  identify a resource reservation associated with the upcoming transmission in the second slot;
  transmit, to the second user equipment, an indication of the resource reservation; and
  determine that the power estimation capability of the second user equipment satisfies the threshold based at least in part on transmitting the indication of the resource reservation.

39. The non-transitory computer-readable medium of claim 37, wherein the instructions are further executable by the at least one processor to:
  identify an absence of a resource reservation associated with the upcoming transmission in the second slot; and
  determine that the power estimation capability of the second user equipment does not satisfy the threshold based at least in part on the identifying.

40. The non-transitory computer-readable medium of claim 37, wherein the instructions are further executable by the at least one processor to:
  identify a first transmission power associated with transmissions in the first slot;
  identify a second transmission power associated with the upcoming transmission in the second slot;
  determine that a difference between the first transmission power and the second transmission power satisfies a second threshold; and
  determine that the power estimation capability of the second user equipment satisfies the threshold based at least in part on the difference.

41. The non-transitory computer-readable medium of claim 37, wherein the instructions are further executable by the at least one processor to:
  identify a first transmission power associated with transmissions in the first slot;
  identify a second transmission power associated with the upcoming transmission in the second slot;
  determine that a difference between the first transmission power and the second transmission power does not satisfy a second threshold; and
  determine that the power estimation capability of the second user equipment does not satisfy the threshold based at least in part on the difference.

42. The non-transitory computer-readable medium of claim 37, wherein the instructions are further executable by the at least one processor to:
  identify a first transmission power associated with the transmission of the first set of data;
  receive, from the second user equipment, a command to adjust the first transmission power;
  adjust, based at least in part on the received command, a second transmission power associated with the upcoming transmission in the second slot; and
  determine that the power estimation capability of the second user equipment satisfies the threshold based at least in part on the adjusting.

43. The non-transitory computer-readable medium of claim 37, wherein the instructions are further executable by the at least one processor to:
  receive a first grant associated with transmissions in the first slot;
  receive a second grant associated with transmissions in the second slot; and
  determine that the power estimation capability of the second user equipment satisfies the threshold based at least in part on the first grant and the second grant.

44. The non-transitory computer-readable medium of claim 37, wherein the first set of data comprises a control transmission.

* * * * *